(12) United States Patent
Akiyama et al.

(10) Patent No.: US 12,277,359 B2
(45) Date of Patent: Apr. 15, 2025

(54) INFORMATION PROCESSING APPARATUS, PHOTOGRAPHED IMAGE TRANSFER AND DISPLAY SYSTEM, AND PHOTOGRAPHED IMAGE TRANSFER AND DISPLAY METHOD

(71) Applicant: MAXELL, LTD., Kyoto (JP)

(72) Inventors: Hitoshi Akiyama, Kyoto (JP);
Nobukazu Kondo, Kyoto (JP);
Yoshinori Okada, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/573,483

(22) PCT Filed: Jul. 1, 2021

(86) PCT No.: PCT/JP2021/024947
§ 371 (c)(1),
(2) Date: Dec. 22, 2023

(87) PCT Pub. No.: WO2023/276109
PCT Pub. Date: Jan. 5, 2023

(65) Prior Publication Data
US 2024/0289077 A1 Aug. 29, 2024

(51) Int. Cl.
*G06F 3/14* (2006.01)
*G06F 3/01* (2006.01)
(Continued)

(52) U.S. Cl.
CPC .............. *G06F 3/14* (2013.01); *G06F 3/012* (2013.01); *G06F 3/013* (2013.01); *G06T 5/50* (2013.01);
(Continued)

(58) Field of Classification Search
None
See application file for complete search history.

(56) References Cited

U.S. PATENT DOCUMENTS

| 11,378,805 B2 * | 7/2022 | Watanabe .......... G02B 27/0172 |
| 11,567,333 B2 * | 1/2023 | Watanabe .............. G06F 3/048 |

(Continued)

FOREIGN PATENT DOCUMENTS

| JP | 2006-060583 A | 3/2006 |
| JP | 2010-220074 A | 9/2010 |

(Continued)

OTHER PUBLICATIONS

International Search Report of PCT/JP2021/024947 dated Sep. 21, 2021.

*Primary Examiner* — Sepehr Azari
(74) *Attorney, Agent, or Firm* — Mattingly & Malur, PC

(57) ABSTRACT

An information processing device comprises: a camera; a display screen for displaying a captured image; a line-of-sight sensor configured to detect a line of sight of a user and output line-of-sight information; a communication unit configured to provide communication with an image display device that is separate from the information processing device; and a processor, wherein the processor is configured to: determine whether a line-of-sight destination of the user is in the display screen based on the line-of-sight information while the camera is capturing an image; upon determining that the line-of-sight destination of the user is not in the display screen, transfer the captured image being displayed on the display screen to the image display device via the communication unit; and transmit, to the image display device, a display start signal for causing the image display device to display the captured image as transferred.

12 Claims, 19 Drawing Sheets

(51) Int. Cl.
*G06T 5/50* (2006.01)
*G06V 10/24* (2022.01)

(52) U.S. Cl.
CPC .... *G06V 10/24* (2022.01); *G06T 2207/20221* (2013.01); *G06V 2201/07* (2022.01)

(56) References Cited

U.S. PATENT DOCUMENTS

| | | | |
|---|---|---|---|
| 12,014,099 B2* | 6/2024 | Kulshrestha | G06F 3/0346 |
| 2010/0208121 A1 | 8/2010 | Kato et al. | |
| 2013/0044130 A1* | 2/2013 | Geisner | G06Q 50/01 |
| | | | 345/633 |
| 2014/0204226 A1 | 7/2014 | Murakami et al. | |
| 2017/0060266 A1* | 3/2017 | Gao | G06F 1/3215 |
| 2019/0122439 A1* | 4/2019 | Thiebaud | G06F 3/1423 |
| 2021/0055789 A1* | 2/2021 | Tsai | G06F 3/017 |
| 2023/0258935 A1* | 8/2023 | Misawa | G02B 27/0101 |
| | | | 345/8 |

FOREIGN PATENT DOCUMENTS

| | | |
|---|---|---|
| JP | 2014-160226 A | 9/2014 |
| JP | 2018-036974 A | 3/2018 |
| JP | 2020-013381 A | 1/2020 |
| WO | 2020/003361 A1 | 1/2020 |
| WO | 2020/213170 A1 | 10/2020 |
| WO | 2021/064823 A1 | 4/2021 |

* cited by examiner

INFORMATION PROCESSING APPARATUS, PHOTOGRAPHED IMAGE TRANSFER AND DISPLAY SYSTEM, AND PHOTOGRAPHED IMAGE TRANSFER AND DISPLAY METHOD

TECHNICAL FIELD

The present invention relates to an information processing device, a captured image transfer and display system, and a captured image transfer and display method, and in particular, relates to an information processing device, an information processing system, and an information processing method, which are configured to switch the terminal on which an image is to be displayed.

BACKGROUND ART

Patent Literature 1 discloses a "digital camera including a camera main body equipped with image sensors and a head mounted finder to be worn on the head of a person who captures images. The person who captures images wear the head mounted finder on his or her head such that a display portion of the head mounted finder is positioned right in front of his or her eyes. When the person captures an image by directing the camera main body held by one of his or her hands toward an object, the image thereof is displayed on the display portion of the head mounted finder (excerpted from Abstract)".

CITATION LIST

Patent Literature

Patent Literature 1: JP-A-2006-60583

SUMMARY OF INVENTION

Technical Problem

An information processing device having a camera function, a display function, and the like, in particular, a portable size one is called a smartphone. A smartphone is as small as the palm of a user and allows an image captured using a camera and various kinds of information to be displayed on a display screen thereof, and is widely used owing to its good usability.

A user who is trying to capture images using a camera of a smartphone, for example, with a lot of people in front of the user may have to extend his or her hand to capture images because of the difficulty in capturing images in front of the eyes with the camera of the smartphone held in the hand. In addition, depending on the position of an object to be captured using the camera, the user may have to capture images thereof with the display screen of the smartphone being difficult to be seen.

For the cases described above, the technique according to Patent Literature 1 may be applied to a smartphone to transfer the captured image to a separate display device. However, if the captured image has been transferred to a separate display device although the user wishes to view the captured image on the display screen mounted on the smartphone, which is contrary to the intention of the user.

The present invention has been made in view of the problems described above, and an object of the present invention is to assist an image capturing operation by a camera under a situation where a display screen of an information processing device such as a smartphone is difficult to be seen.

Solution to Problem

In order to solve the problems above, the present invention includes the features described in the scope of claims. One of the aspects thereof is an information processing device, comprising: a camera; a display screen for displaying a captured image captured by the camera; a line-of-sight sensor configured to detect a line of sight of a user and output line-of-sight information indicating a line-of-sight direction of the user; a communication unit configured to provide communication with an image display device that is separate from the information processing device; and a processor connected to the camera, the display screen, the line-of-sight sensor, and the communication unit, respectively, the processor being configured to: determine whether a line-of-sight destination of the user is in the display screen based on the line-of-sight information while the camera is capturing an image; upon determining that the line-of-sight destination of the user is not in the display screen, transfer the captured image being displayed on the display screen to the image display device via the communication unit; and transmit, to the image display device, a display start signal for causing the image display device to display the captured image as transferred.

Advantageous Effects of Invention

According to the present invention, it is possible to assist an image capturing operation of a camera under a situation where a display screen of an information processing device such as a smartphone is difficult to been seen. The problems, configurations, and advantageous effects other than those described above will be clarified by the explanation of the embodiments below.

DESCRIPTION OF EMBODIMENTS

Hereinafter, exemplified embodiments according to the present invention will be described with reference to the drawings. Throughout all the drawings, the same components are provided with the same reference signs, and repetitive explanation thereof will be omitted.

First Embodiment

In the first embodiment, a captured image transfer system 1 in which an information processing device equipped with a camera function is made cooperated with an image display device configured separately from the information processing device to transfer a captured image to the image display device as necessary is exemplified.

Each of FIG. 1A to FIG. 1F is a diagram schematically explaining the appearance of the captured image transfer system 1 according to the first embodiment of the present invention. In the following, a smartphone 100 is exemplified as the information processing device, and a head-mounted display (HMD, hereinafter, referred to as an HMD) 200 is exemplified as the image display device.

Figure 1A:
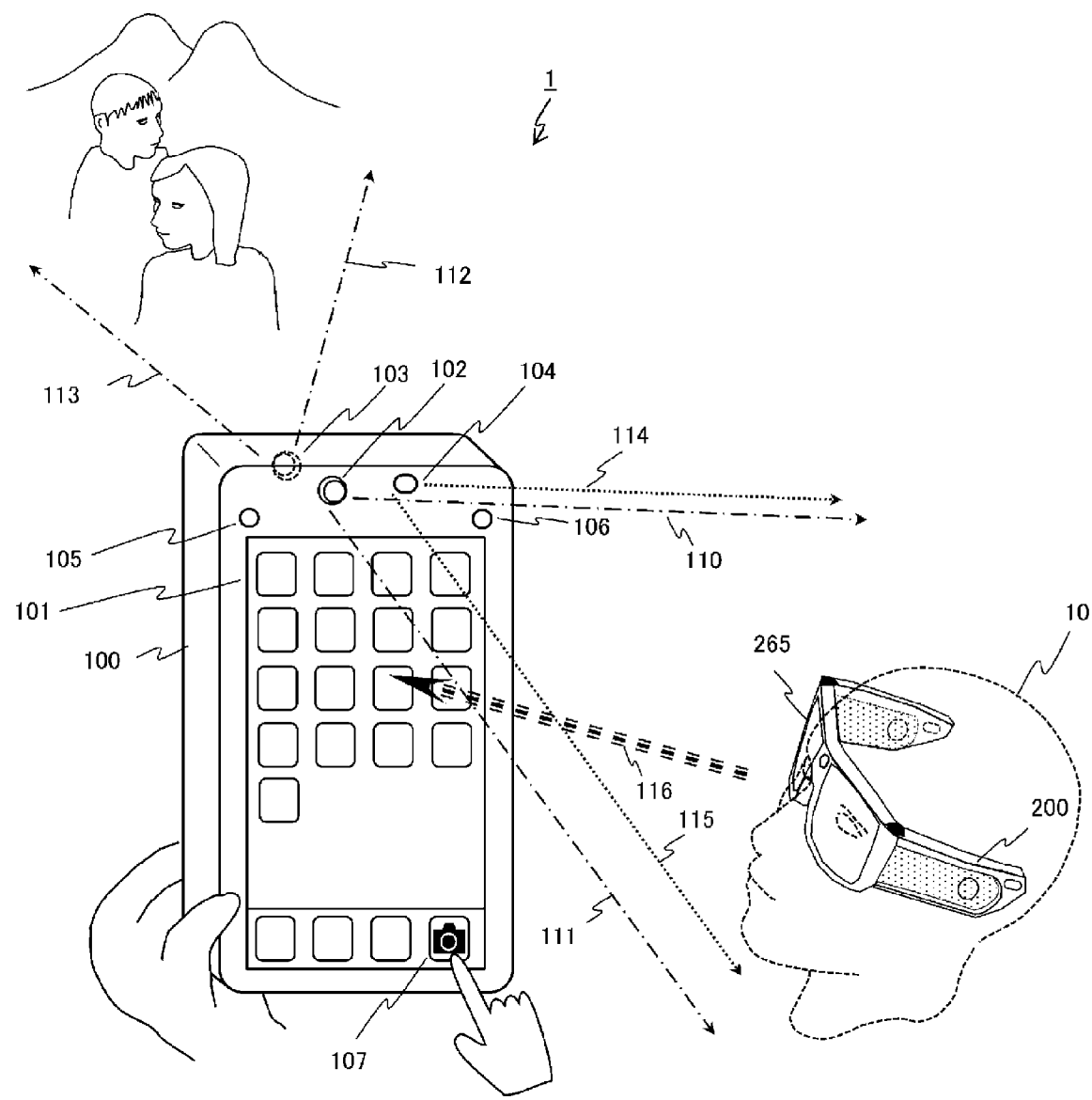
FIG. 1A is a diagram schematically explaining the appearance of a captured image transfer system according to the first embodiment.

In FIG. 1A, the HMD 200 is an image display device configured to three-dimensionally display a virtual object while recognizing a real object in a real space, using an augmented reality (AR) technology for reflecting and augmenting a virtual object in a virtual space, which is an image created based on other images or CG (computer graphics), into the real space.

The HMD 200 may be the one allowing a user to view a real object in front of the eyes while displaying a virtual object on a display portion (optical see-through HMD), or the one configured to display a real object in a real space and a virtual object on a display portion provided in front of the head (video see-through HMD). Using the HMD 200, a user 10 can closely view the real object and the virtual object to be viewed.

The user 10 is holding the smartphone 100 in the hand and wearing the HMD 200 on the head. The smartphone 100 is provided with, on the side of a display screen 101 and the side opposite thereto, an in-camera 102 and an out-camera 103 for capturing images of a surrounding field of view.

The smartphone 100 is further provided with, on the side of the display screen 101, a depth sensor 104, a left line-of-sight sensor 105, and a right line-of-sight sensor 106.

The smartphone 100 is further provided with, on the side of the display screen 101, a camera capturing mode button 107 configured to, upon being touched, cause the camera to start and shift to a capturing display mode.

The in-camera 102 captures images of a surrounding person and scenery within a capturing range (within an angle of view) between a direction 110 and a direction 111.

The out-camera 103 captures images within a capturing range between a direction 112 and a direction 113.

The depth sensor 104 measures the distance and angle from the smartphone 100 to an object, and outputs distance information indicating which angle and at which the distance the object is located as viewed from the depth sensor 104. The depth sensor 104 also serves as a sensor allowing the shape of an object such as a person or a structural object to be captured as a three-dimensional object within an observation range between a direction 114 and a direction 115. The depth sensor 104 is also capable of detecting and identifying the user 10 who is looking at the smartphone 100.

The left line-of-sight sensor 105 and the right line-of-sight sensor 106 are configured to detect the motion and direction of the left eye and the right eye on the face of the user 10 detected and identified by the depth sensor 104, respectively. The left line-of-sight sensor 105 and the right line-of-sight sensor 106 detect the lines of sight 141, 142 of both the left eye and the right eye so as to allow a line-of-sight destination 116 to be three-dimensionally captured. The line-of-sight directions output from the left line-of-sight sensor 105 and right line-of-sight sensor 106 correspond to line-of-sight information, and each point on the line-of-sight directions corresponds to a line-of-sight destination.

The HMD 200 is worn on the head of the user 10, and this causes a display 265 to be positioned in front of the eyes of the user 10. An image is shown on a display screen 132 (see FIG. 1C) of the display 265 as a virtual object. In the case of the display 265 of a transmissive type, a virtual object is superimposed on a real object in front of the eyes and displayed. In the case of the HMD 200 of an immersive type, a virtual object is superimposed on an image captured by the out-camera 203 (see FIG. 3) of the HMD 200, which allows the user 10 to experience an augmented reality.

Upon being turned on, the smartphone 100 shows a display screen in a normal menu display mode illustrated in FIG. 1A. In the menu display mode, the camera capturing mode button 107, various application icons, and the like are displayed on the display screen 101. In this state, when the user 10 touches the camera capturing mode button 107, the normal menu display mode is shifted to the capturing display mode on the display screen 101.

Figure 1B:
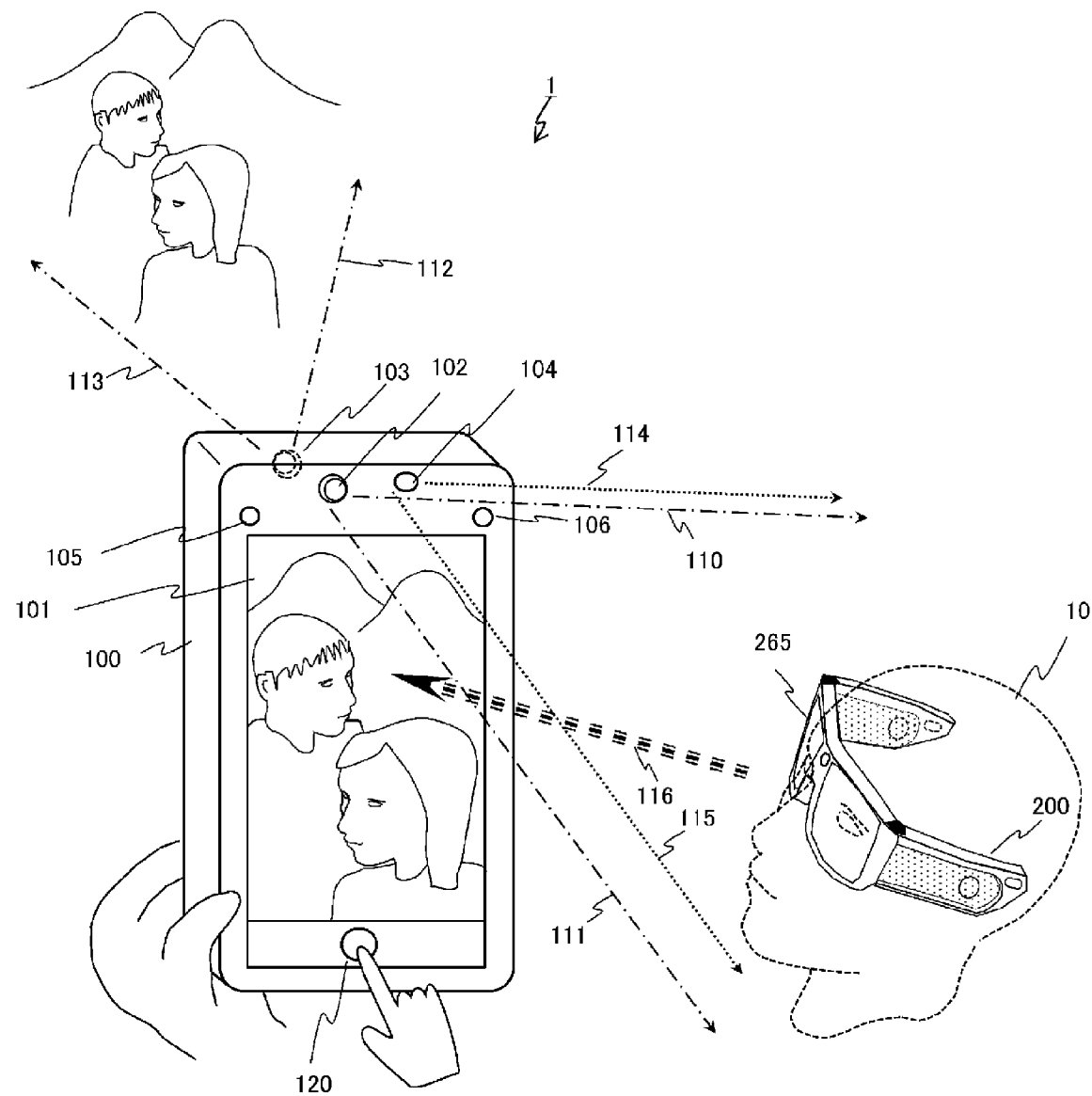
FIG. 1B is a diagram schematically explaining the appearance of a captured image transfer system according to the first embodiment.

In the capturing display mode illustrated in FIG. 1B, the captured image captured by the out-camera 103 is displayed on the display screen 101. In addition, on the display screen 101, a shutter button 120 provided to input an instruction for causing the captured image to be stored in a memory 170 (which is one aspect of a storage) of the smartphone 100 is displayed. In many cases, the shutter button 120 is displayed in an area small enough to be touched by a fingertip so that the captured image can be displayed in an area as large as possible.

The user 10 who is looking at the display screen 101 can touch the shutter button 120 being displayed in the small area at the scene to be recorded while viewing the captured image being displayed sufficiently.

However, if the display screen 101 is hardly seen or cannot be seen at all, the user 10 cannot view the captured image being displayed on the display screen 101 sufficiently. This may make it difficult for the user 10 to perform a touch operation on the shutter button 120 being displayed in such a small area successfully at the moment of the scene to be recorded.

Figure 1C:
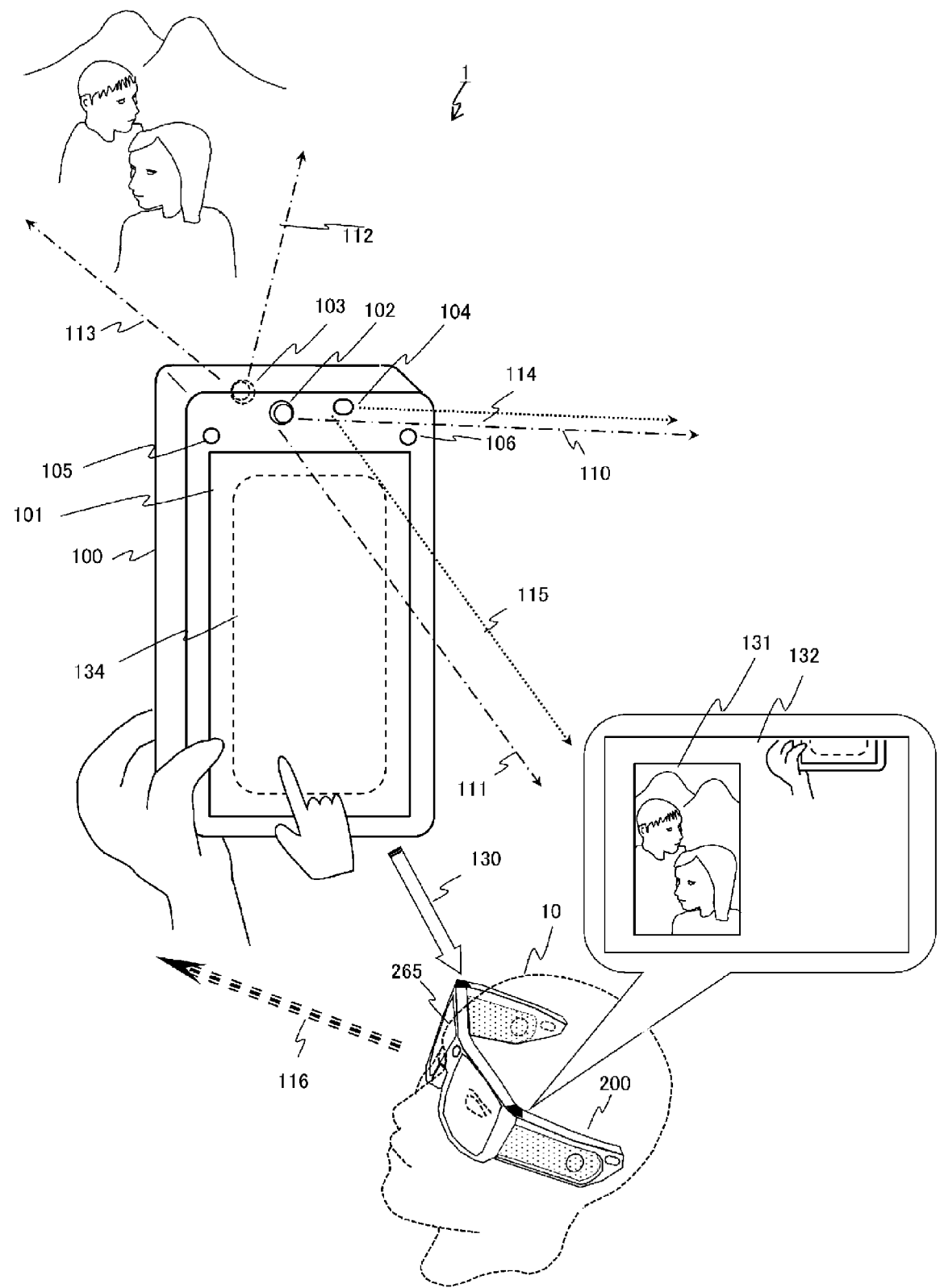
FIG. 1C is a diagram schematically explaining the appearance of a captured image transfer system according to the first embodiment.

The present embodiment is provided to respond to difficult situations described above. In the present invention, line-of-sight states of the user 10 are detected, and when it is determined that the user 10 is not looking at the display screen 101, as illustrated in FIG. 1C, the captured image by the out-camera 103 is transferred from the smartphone 100 to the HMD 200. In FIG. 1C, an arrow 130 expresses the direction in which the captured image is transferred.

The HMD 200 displays, as a virtual object, a captured image 131 as transferred on the display 132. Using the HMD 200, the user 10 can view the transferred captured image 131 as the virtual object, together with the real object in front of the eyes.

The processor 167 (see FIG. 3) of the smartphone 100 identifies the left eye and the right eye in the face of the user 10 based on the depth sensor information output by the depth sensor 104, detects the direction of the line-of-sight destination 116 based on the left line-of-sight information and the right line-of-sight information of the left line-of-sight sensor 105 and the right line-of-sight sensor 106, respectively, and determines whether the display screen 101 is on the extension of the line-of-sight destination 116. If the display screen 101 is on the extension of the line-of-sight destination 116, the processor 167 determines that the user 10 is looking at the display screen 101. Note that one line-of-sight sensor may be used.

On the other hand, when cannot identifying the left eye and the right eye in the face of the user 10 using the depth sensor 104, or when determining that the line-of-sight destination is not on the display screen 101 even though identifying them, the processor 167 determines that the user 10 is not looking at the display screen 101. Note that the line-of-sight destination of the left eye and right eye in the face may be detected based on the captured image by the in-camera 102 using an image processing algorithm for face recognition.

Establishing the communication between the smartphone 100 and the HMD 200 in advance allows the captured image to be displayed on the HMD 200 as soon as the mode is shifted to the transmission mode. Note that the captured image by the smartphone 100 does not always have to be displayed on the HMD 200 even if the communication has been established. Furthermore, the shutter button 120, various operation buttons, and the like are displayed together with the captured image on the display screen 101 of the smartphone 100, however, not all of them have to be displayed by screen-mirroring and only the captured image may be displayed as a transferred image transferred from the smartphone 100 to the HMD, since the necessity of displaying the shutter button 120, various operation buttons, and the like is considered to be low in normal use cases. Transfer determination of whether the captured image is to be transferred is made by the processor 167 mounted on the smartphone 100. Upon determining that the line-of-sight destination 143 is not directed to the display screen 101 based on each of the sensor information by the depth sensor 104, the left line-of-sight sensor 105, and the right line-of-sight sensor 106, the processor 167 transfers the captured image to the HMD 200. Alternatively, a processor 267 of the HMD 200 may determine that the line-of-sight destination 143 is not directed to the display screen 101 based on each of the sensor information by a depth sensor 204, a left line-of-sight sensor 205, and a right line-of-sight sensor 206 which are mounted on the HMD 200, and transmit a transfer request signal for requesting transmission of the captured image to the smartphone 100, so that the smartphone 100 transfers the captured image in response thereto. Furthermore, the processor 267 may transmit each of the sensor information by the depth sensor 204, the left line-of-sight sensor 205, and the right line-of-sight sensor 206 which are mounted on the HMD 200 to the smartphone 100, so that the processor 167 of the smartphone 100 can make the transfer determination based on the sensor information as received. The same applies to the transfer determination in each of the following embodiments.

Thus, for example, even when the user 10, who is having difficulty in viewing the display screen 101 of the smartphone 100 or cannot see it at all is trying to capture an image, in other words, even when the user 10 cannot sufficiently view the captured image being displayed on the display screen 101, he or she can clearly view the captured image captured by the out-camera 103 of the smartphone 100 by looking at the captured image 131 being displayed on the HMD 200.

Furthermore, while transferring the captured image captured by the out-camera 103 to the HMD 200 based on the determination that the user 10 is not looking at the display screen 101, the processor 167 of the smartphone 100 sets the display screen 101 in a non-display state and displays an extended shutter button 134 provided for a shutter button operation to be performed upon detection of a touch operation, in the display area of the captured image on the display screen 101.

This enables the user 10 who has a difficulty in seeing the display screen 101 or cannot see it at all to perform a touch operation on the shutter button 120 in a wide operation area within the display screen 101, and thus capture a scene to be recorded with high reliability and convenience. In other words, while the captured image is transferred to the HMD 200, the user 10 can click the shutter even by touching an image display area that is not for the shutter button 120 within the display screen 101 of the smartphone 100. This enables the user 10 to perform a shutter button operation even without viewing the display screen 101 of the smartphone 100.

Furthermore, eliminating unnecessary and useless display of the captured image while the user 10 cannot view it leads to the reduction in power consumption. Note that the area that can be touched as the shutter button 120 does not have to be the entire display screen. For example, the extended shutter button 134 may be provided in an area inside a predetermined margin area from the edge of the display screen 101, avoiding an area thereof corresponding to the position where the hand holds the smartphone 100. In FIG. 1C, the extended shutter button 134 is provided not in the entire display screen 101 but only in the inside limited area. This prevents the shutter button 120 from reacting to the hand holding the smartphone 100.

Figure 1D:
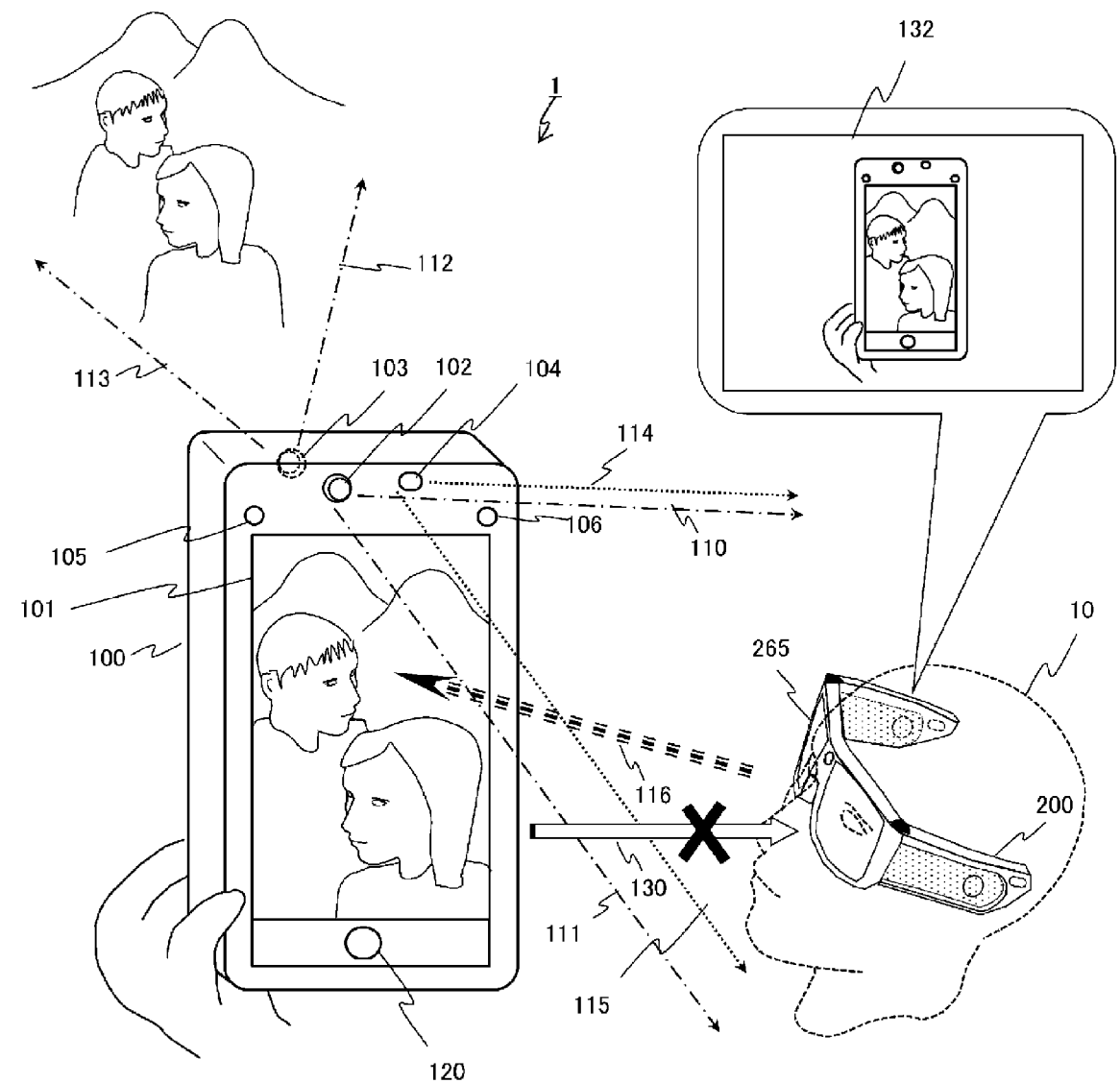
FIG. 1D is a diagram schematically explaining the appearance of a captured image transfer system according to the first embodiment.

On the other hand, when it is detected that the user 10 is looking at the display screen 101, as illustrated in FIG. 1D, transferring of the captured image from the smartphone 100 to the HMD 200 is stopped, so as not to be performed. The image that has been being transferred to the display screen 132 of the HMD 200 is stopped to be displayed, and thus the user 10 can directly view the display screen 101 in front of the eyes.

Figure 1E:
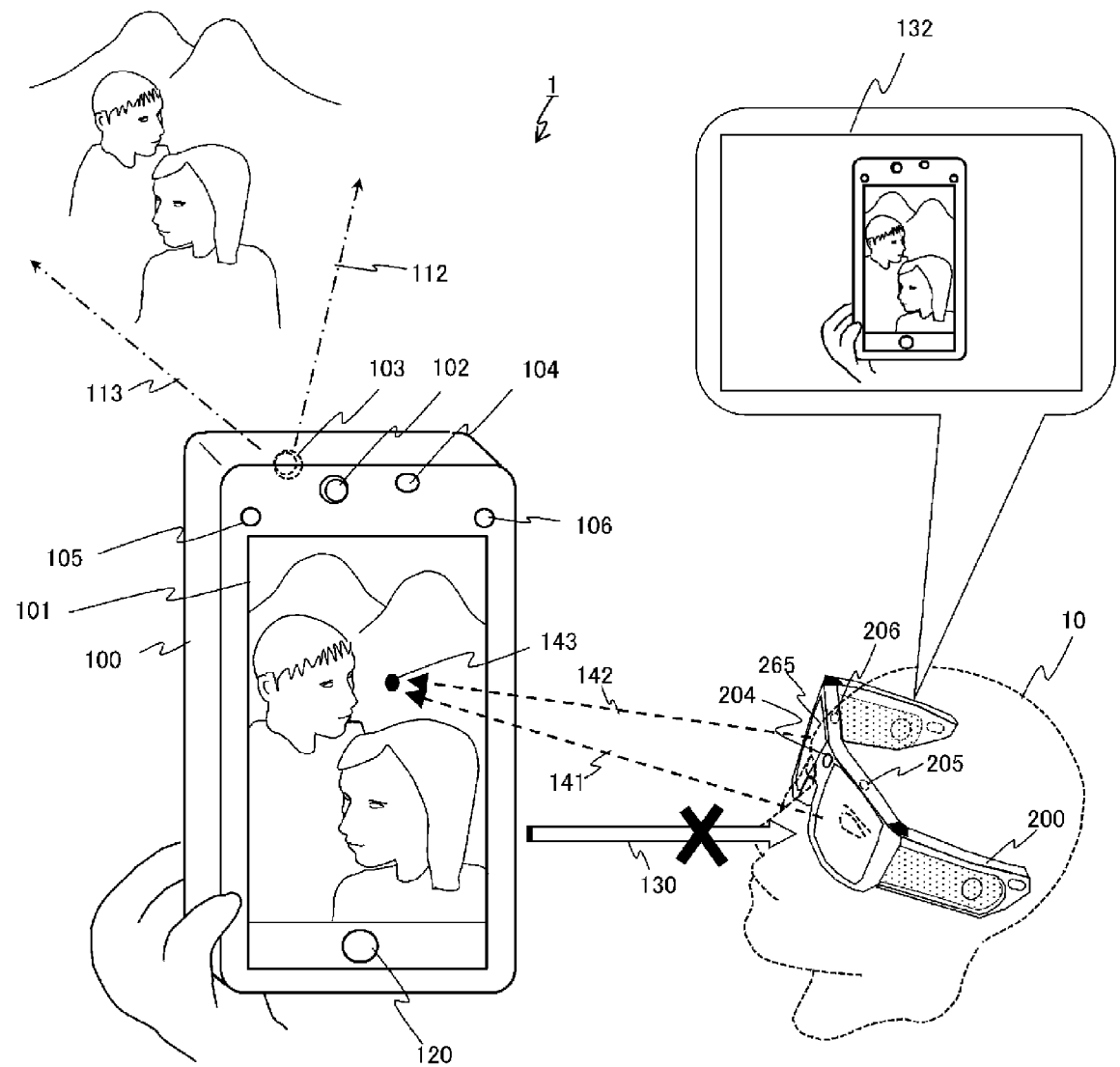
FIG. 1E is a diagram schematically explaining the appearance of a captured image transfer system according to the first embodiment.

Furthermore, in the HMD 200 including the depth sensor 204, the left line-of-sight sensor 205, and the right line-of-sight sensor 206, as illustrated in FIG. 1E, it may be configured that the depth sensor 204 is used to identify the display screen of the smartphone 100 in front of the user 10 while the left line-of-sight sensor 205 and the right line-of-sight sensor 206 are used to detect the line-of-sight 141 of the left eye and the line-of-sight 142 of the right eye, so as to determine whether the line-of-sight destination 143 is directed to the display screen 101 of the smartphone 100. When it is determined that the line-of-sight destination 143 is in the display screen 101, the captured image is not transferred from the smartphone 100 to the HMD 200 and thus not displayed on the HMD 200. That is, the same operations as those illustrated in FIG. 1D are performed.

Figure 1F:
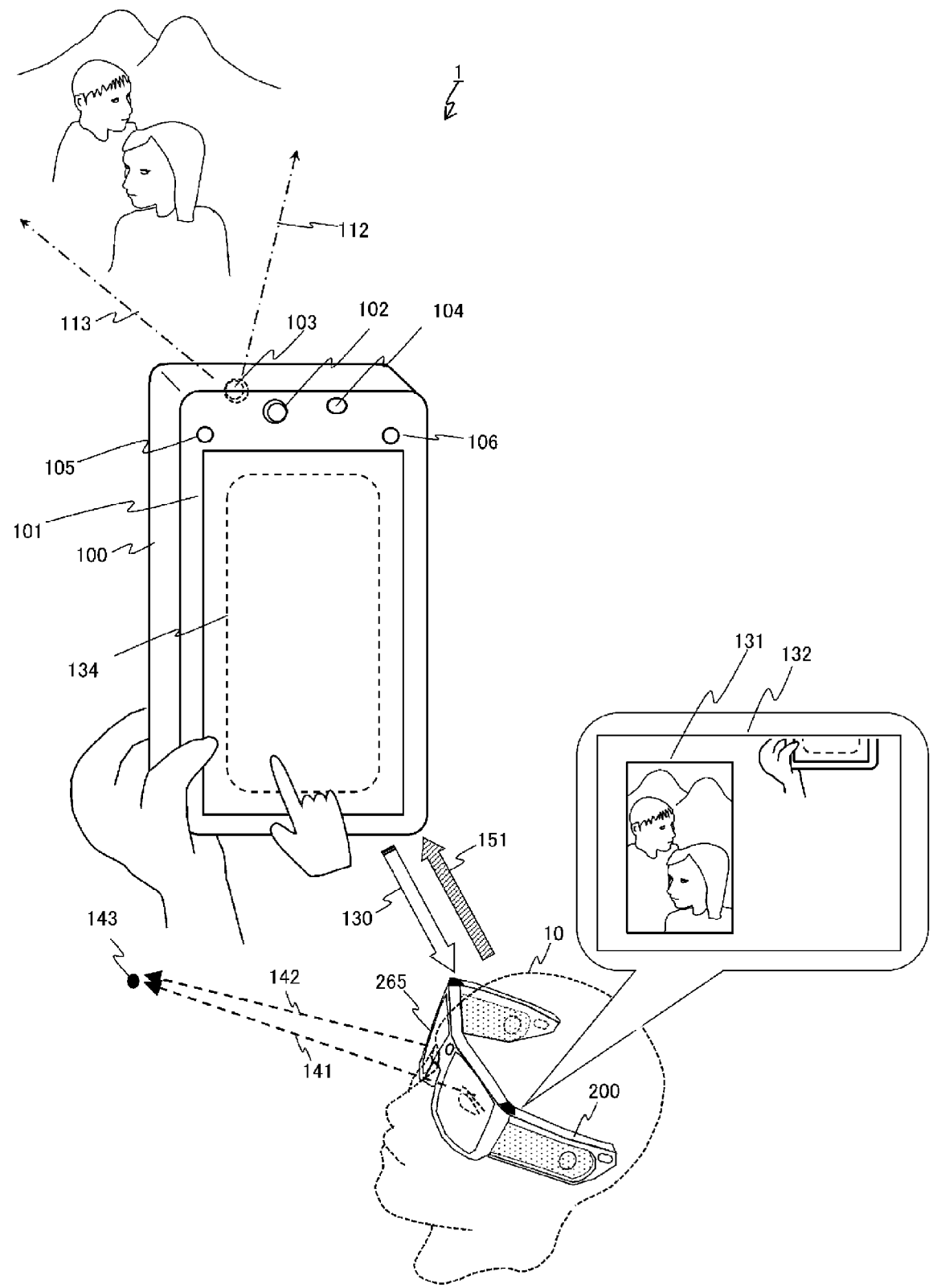
FIG. 1F is a diagram schematically explaining the appearance of a captured image transfer system according to the first embodiment.

On the other hand, upon determining that the line-of-sight destination 143 is not directed to the display screen 101, the HMD 200 transmits the detection result information to the smartphone 100 as illustrated in FIG. 1F (this transfer is illustrated with an arrow 151). Upon receiving the detection result as transferred, the smartphone 100 transfers the captured image captured by the out-camera 103 from the smartphone 100 to the HMD 200 (this transfer is illustrated with an arrow 130), and the HMD 200 displays the captured image 131 as received on the display screen 132 in the same manner as illustrated in FIG. 1C.

In other words, when the processor 267 mounted in the HMD 200 determines that the line-of-sight destination 143 is not directed to the display screen 101 based on each of the sensor information by the depth sensor 204, the left eye-of-sight sensor 205, the right line-of-sight sensor 206, the processor 267 transmits the transfer request signal for requesting transfer of the captured image to the smartphone 100, and the smartphone 100 transfers the captured image in response thereto.

Alternatively, each of the sensor information by the depth sensor 204, the left line-of-sight sensor 205, and the right line-of-sight sensor 206 which are mounted on the HMD 200 may be transmitted to the smartphone 100, so that the processor 167 of the smartphone 100 can determine whether the captured image is to be transferred based on the sensor information as received.

In the same manner as FIG. 1A to FIG. 1D, while the captured image is transferred to the HMD 200, on the smartphone 100, the display screen 101 is made in the non-display state so as to enable the shutter button operation to be performed by touching any area of the display screen 101.

This enables, even in the case where the HMD 200 detects whether the user 10 is looking at the display screen 101 of the smartphone 100, the same functions and advantageous effects as the case where the smartphone 100 detects whether the user 10 is looking at the display screen 101 of the smartphone 100 to be obtained.

Note that one line-of-sight sensor may be used. Providing a line-of-sight sensor on the HMD 200 allows the performance similar to the line-of-sight detection of both eyes to be obtained even when the user 10 is relatively distant from the smartphone 100.

In the operations described above, the information processing device exemplified by the smartphone 100 may be configured to instruct and control the operations of the image display device exemplified by the HMD 200, or an information processing system including the information processing device and the image display device may be configured. With this configuration, the user 10 can check the captured image by the information processing device clearly even in the situation where the display screen 101 of the information processing device such as the smartphone 100 is difficult to be seen from the user 10, and moreover, can operate the shutter button easily. This can result in improved usability.

Figure 2:
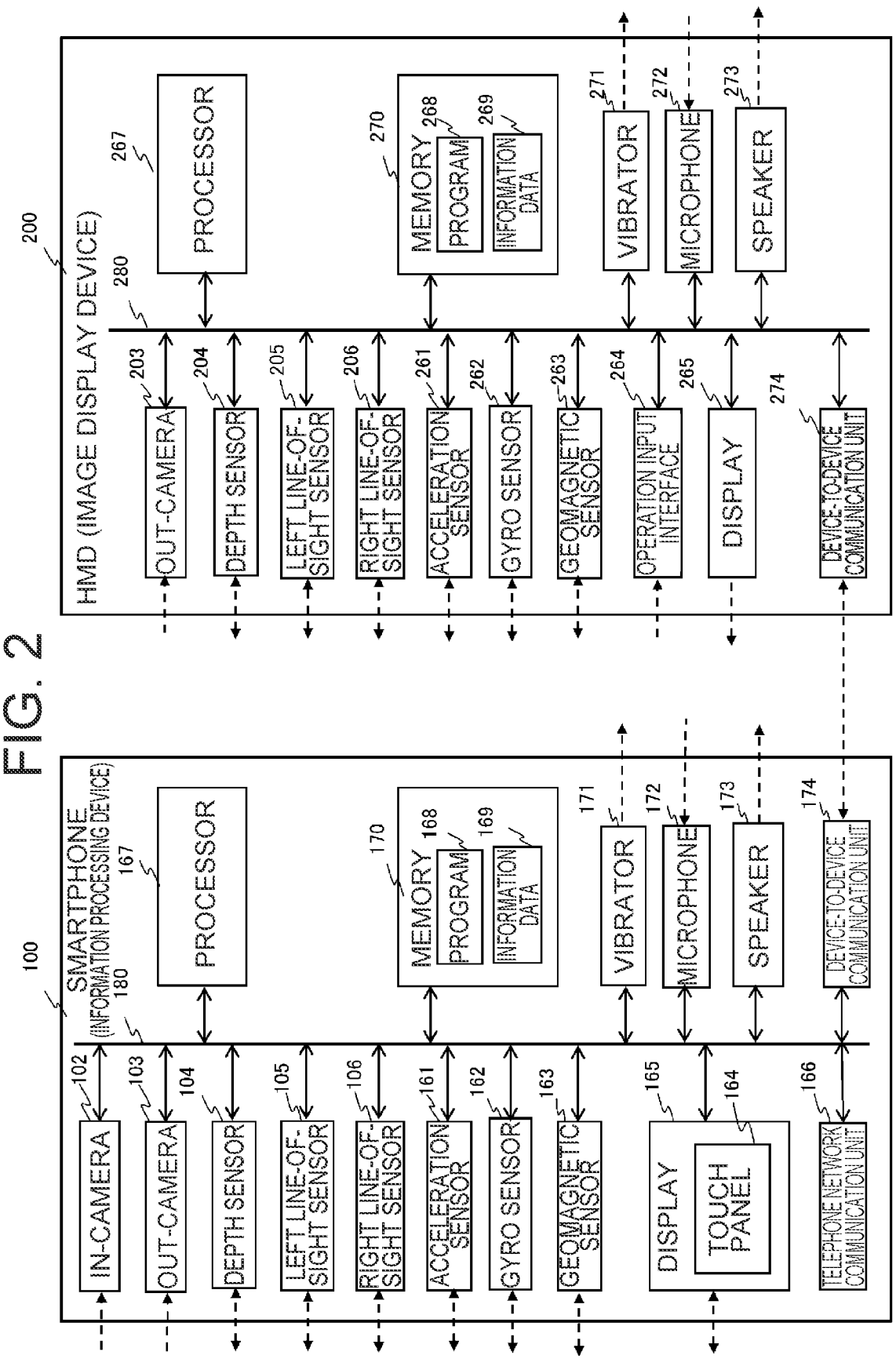
FIG. 2 illustrates hardware a configuration of a smartphone and that of an HMD.

Next, the hardware configuration of the smartphone 100 and that of the HMD 200 will be described with reference to FIG. 2. FIG. 2 illustrates the hardware configurations of the smartphone 100 and the HMD 200, respectively.

The smartphone 100 includes the in-camera 102, the out-camera 103, the depth sensor 104, the left line-of-sight sensor 105, the right line-of-sight sensor 106, an acceleration sensor 161, a gyro sensor 162, a geomagnetic sensor 163, a touch panel 164, a display 165, a telephone network communication unit 166, the processor 167 (first processor), the memory 170 in which a program 168 and information data 169 are stored, a vibrator 171, a microphone 172, a speaker 173, and a device-to-device communication unit 174 (first communication unit). Each component is connected with each other via a bus 180.

The HMD 200 includes the out-camera 203, the depth sensor 204, the left line-of-sight sensor 205, the right line-of-sight sensor 206, an acceleration sensor 261, a gyro sensor 262, a geomagnetic sensor 263, an operation input interface 264, the display 265, the processor 267 (second processor), a memory 270 in which a program 268 and information data 269 are stored, a vibrator 271, a microphone 272, a speaker 273, and a device-to-device communication unit 274 (second communication unit). Each component is connected with each other via a bus 280.

The in-camera 102 converts a light incident from a lens into an electric signal via an imaging element to capture images of the user 10 or the like who is looking at the display 165.

Each of the out-cameras 103, 203 captures images of a state in the field-of-view around the front, and converts a light incident from a lens into an electric signal via an imaging element to obtain a captured image.

The out-camera 103 mounted on the smartphone 100 captures images of the rear surface side of the display 165 of the smartphone 100. Using the out-camera 103, the user 10 can capture images of the surrounding field of view by raising the smartphone 100 toward the outside.

The out-camera 203 mounted on the HMD 200 captures images of a field of view as viewed from the HMD 200 worn by the user 10.

The depth sensors 104, 204 measure a distance and an angle to an object and capture the shape of an object such as a person or a structural object as a three-dimensional object. The depth sensors 104, 204 may be, for example, a LIDAR (Light Detection and Ranging) sensor which irradiates an object with a laser light such as an infrared ray and measures the scattered light that has been reflected to detect the distance to an object at a distance, a TOF (Time Of Flight) sensor which measures the reflection time of a pulsed light irradiated to a subject for each pixel to measure the distance, and a millimeter wave radar which emits a millimeter radio wave and captures the reflected wave to detect the distance to an object that has reflected the wave.

The depth sensor 104 of the smartphone 100 can detect the user 10 and identify both the eyes from the face of the user 10 as detected when the user 10 is looking at the display screen 101. For example, the entire shape of the face of the user 10 may be recognized using the depth information by the depth sensor 104 so that the positions of both the eyes can be estimated based on the entire shape.

In addition, the depth sensor 204 of the HMD 200 can identify the distance to the display screen 101 when the display screen 101 of the smartphone 100 is positioned in front of the user 10.

The left line-of-sight sensors 105, 205 and the right line-of-sight sensors 106, 206 capture the motion and directions of the right eye and the left eye and detect the lines of sight 141, 142, respectively. Note that, for the processing of detecting the lines of sight 141, 142, a well-known technique commonly used as the eye tracking processing may be used. For example, as a technique using corneal reflection, there is known a technique of irradiating a face using an infrared LED (Light Emitting Diode) and capturing images with an infrared camera, to detect the lines of sight 141, 142, using the position of the reflection light on the corneal (corneal reflection) made by the irradiation of the infrared LED as a reference point, based on the position of the cornea relative to the position of the corneal reflection. There is also known a method of capturing an image of an eye using a visible light camera (in the case of the smartphone 100, the in-camera 102 may also serve as the visible light camera), to detect the lines of sight 141, 142, using the eye head as the reference point and using the iris as the moving point, based on the position of the iris relative to the eye head. The line-of-sight destination of the user 10 can be identified based on the lines of sight 141, 142 of both the eyes detected by the left line-of-sight sensors 105, 205 and the right line-of-sight sensors 106, 206.

Each of the acceleration sensors 161, 261 is a sensor for detecting the acceleration that is the change in speed per unit time, and can capture the motion, vibration, impact, and the like.

Each of the gyro sensors 162, 262 is a sensor for detecting the angular velocity in the rotation direction, and can capture the posture states in the vertical, horizontal, and oblique directions.

Using the acceleration sensor 161 and the gyro sensor 162 of the smartphone 100, the posture such as the tilt and direction of the smartphone 100 can be detected.

Similarly, using the acceleration sensor 261 and the gyro sensor 262 of the HMD 200, the posture such as the tilt and direction of the HMD 200 worn by the user 10.

Each of the geomagnetic sensors 163, 263 is a sensor for detecting the magnetic force of the Earth, and detects the directions in which the smartphone 100 and the HMD 200 are directed, respectively. Using a three-axis sensor for detecting, in addition to the magnetic field in the front and rear direction and that in the left and right direction, the magnetic field in the vertical direction, the motion of the smartphone 100 and that of the HMD 200 may be detected by capturing the change in the magnetic force with respect to the motion of the smartphone 100 and that of the HMD 200.

This group of sensors (acceleration sensor, gyro sensor, and geomagnetic sensor) is used to detect the tilt (posture) of the smartphone 100 and the motion of the head of the user 10 wearing the HMD 200. Thus, it can be said that the group of sensors mounted on the smartphone 100 corresponds to a posture sensor for outputting posture information indicating the tilt of the smartphone 100, and the group of sensors mounted on the HMD 200 corresponds to a motion detection sensor for detecting the motion of the head of the user 10 and outputting motion quantity information.

When the display screen of the display 165 of the smartphone 100 is difficult to be seen, the user 10 is likely to tilt the smartphone 100. Using the posture state as detected and determined, the captured image which was captured in the tilted state is brought to be in a horizontal state, so that the capturing object is to be corrected in an original state.

The processors 167, 267 are configured with a CPU and the like, and execute programs 168, 268 such as an operating system (OS) and an operation control application stored in the memories 170, 270, thereby controlling each of the components and carrying out the operation control processing for whole of the smartphone 100 and the HMD 200.

Furthermore, the processor 167 of the smartphone 100 may be configured to control the operations of the HMD 200 by device-to-device communication (wireless communication).

For example, the processor 167 may be configured to, in the case where the smartphone 100 detects that the user 10 is not looking at the display screen 191 of the smartphone 100, transmit the captured image to the HMD 200 and carry out the control so that the HMD 200 displays the captured image as transferred thereon.

When the smartphone 100 detects that the user 10 is looking at the display screen 101 of the smartphone 100, the processor 167 stops transferring the captured image, and moreover, transmits a display stop signal for stopping displaying the captured image that has been already transferred to the HMD 200.

Each of the memories 170, 270 is an aspect of storage, and configured with, for example, a flash memory or the like, and retains the programs 168, 268 such as an operating system and an operation control application used by the processors 167, 267.

The memories 170, 270 also retain information data 169, 269 such as images, audio data, signals, and the like to be handled by the smartphone 100 and the HMD 200. The information data 169, 269 includes, for example, image data captured by the in-camera 102 and the out-cameras 103, 203. The memories 170, 270 store the captured image upon detecting a touch operation on the shutter button 120 or the extended shutter button 134.

The display 165 of the smartphone 100 is configured with a liquid crystal or the like, on which the touch panel 164 having high transparency is laminated. The display 165 shows the display content through the touch panel 164.

The display 165 displays the captured image captured by the out-camera 103 or the in-camera 102, various operation buttons such as a camera capturing mode button 107 and the shutter button 120, icons for starting applications and displaying various states, notification information to the user 10, and the like.

The touch panel 164 includes, for example, a pressure-sensitive sensor for detecting the pressure of contact, and detects a touch operation on the display screen 101 and the position and area touched by the hand holding the display screen 101. The touch panel 164 is not limited to the pressure-sensitive sensor, and any sensor may be used for the touch panel 164 such as a capacitive sensor that detects a weak current generated when the display screen 101 is touched, in other words, the change in the capacitance, or an ultrasonic surface acoustic wave sensor that detects the position on the screen touched by a finger or the like, using attenuation of an ultrasonic surface acoustic wave. In any type, the same operations can be obtained.

The touch panel 164 corresponds to an operation input device allowing the user 10 to input the information to the smartphone 100. Other examples of the operation input device may be an input device such as a keyboard or a key button, and an audio input device using audio data input from the microphone 172.

In the case of the optical see-through HMD 200, the display 265 of the HMD 200 may include, for example, a projection portion that projects a virtual object, such as the captured image transmitted from the smartphone 100, the notification information to the user 10, and the like, and a transparent half-mirror that forms and displays a projected virtual object or the like in front of the eyes.

This allows the user 10 to view the virtual object that has been formed as if it were floating, together with a real object that is in the field of view range in front of the eyes.

In the case of the video see-through HMD 200, the display 265 is configured using, for example, a liquid crystal panel that displays the real object in front of the eyes captured by the out-camera 203 together with a virtual object. This allows the user 10 to view the real object within the field of view image in front of the eyes and the virtual object with being superimposed to each other.

As the operation input interface 264 of the HMD 200F, for example, an input device using a keyboard, a key button, a touch key, or the like is used.

The operation input interface 264 may be provided in the HMD 200 at any position and in any form which allow the user 10 to easily perform an input operation, or may be separately provided from the main body of the HMD 200 and connected thereto by wired or wireless communication.

Furthermore, an input operation screen may be displayed within the display screen of the display 265 so as to capture the input operation information based on the position on the input operation screen where the lines of sight 141, 142 detected by the left line-of-sight sensor 205 and the right line-of-sight sensor 206 are being directed.

Still further, a pointer may be displayed on the input operation screen so as to capture the input operation information based on the pointer operated using the operation input interface 264.

Still further, a voice uttered by the user 10 to express an input operation may be collected using the microphone 272 so as to capture the input operation information.

The microphones 172, 272 collect the sounds from the outside and voices of the user 10 to capture them into the smartphone 100 and the HMD 200.

In the case of audio input, audio information provided to execute the shutter button operation which uttered by the user 10 who is looking at the captured image being displayed on the HMD 200 without viewing the display screen 101 of the smartphone 100 may be collected using the microphone 172, 272, so that the shutter button operation can be made on the smartphone 100.

The speakers 173, 273 output various types of output information in the smartphone 100 and the HMD 200 to the outside using sounds, which enables the user 10 to know the notification and instruction information by means of the sounds. For example, the notification includes the one that it has been detected that the user 10 is not looking at the display screen 101 of the smartphone 100, and the one that the extended shutter button 134 has been set on the display screen 101. Furthermore, the setting position of the extended shutter button 134, for example, whether the extended shutter button 134 is set on the whole of the display screen 101 or around center of the display screen 101 may be notified.

Each of the speakers 173, 273 is an aspect of an audio output device, and earphones and headphones are used in the same manner as the speakers 173, 273.

Each of the vibrators 171, 271 generates a vibration under control of the processors 167, 267, respectively, and converts the notification instruction information output by the smartphone 100 and the HMD 200 to the user 10 into the vibration.

Providing the vibrator 171 allows a vibration to be transmitted to the hand holding the smartphone 100 and providing the vibrator 271 allows a vibration to be transmitted to the head of the user 10 wearing the HMD 200, so that the user 10 can be notified with the notification instruction information.

The device-to-device communication units 174, 274 are communication interfaces for wireless communication between the smartphone 100 and the HMD 200 by near field wireless communication or wireless LAN.

Each of the device-to-device communication units 174, 274 includes a communication processing circuit, an antenna, and the like corresponding to various communication interfaces, and transmits and receives the captured image data, control signals, and the like.

Examples of near field wireless communication include Bluetooth (registered trademark), IrDA (Infrared Data Association, registered trademark), Zigbee (registered trademark), Home RF (Home Radio Frequency, registered trademark). An example of wireless LAN includes Wi-Fi (registered trademark).

The telephone network communication unit 166 is a communication unit for transmitting and receiving data by base station communication or long-distance wireless communication. For example, as a method of base station communication, long-distance wireless communication such as W-CDMA (Wideband Code Division Multiple Access, registered trademark) or GSM (Global System for Mobile Communications) may be used.

For high-definition video or the like with the large amount of data, employing wireless communication with a high-speed and large-capacity communication network such as 5G (5th Generation, 5th-generation mobile communication system) or a local 5G enables remarkably improved usability.

Figure 3:
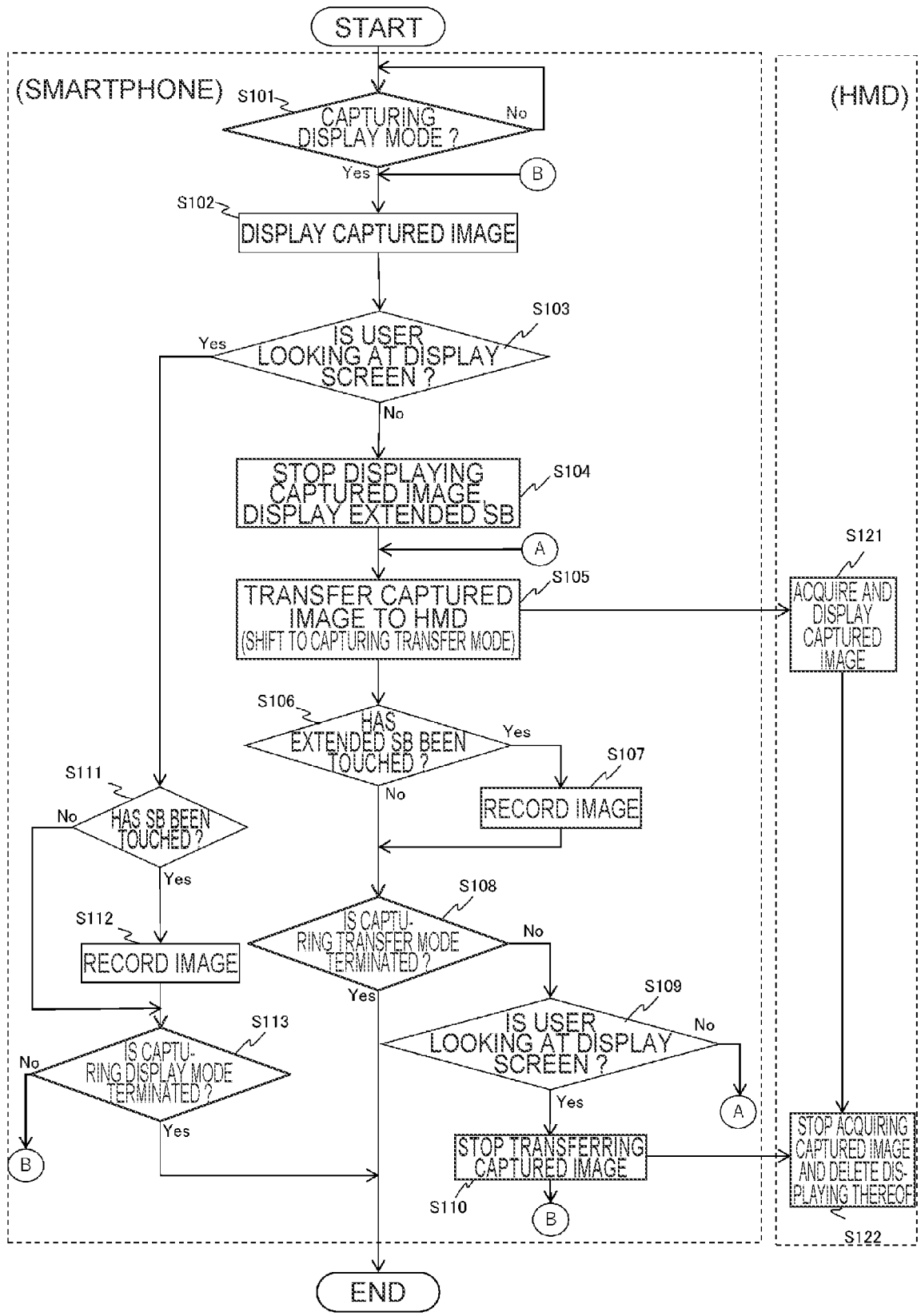
FIG. 3 illustrates a flowchart for explaining a basic operation of a captured image transfer system according to the first embodiment.

FIG. 3 illustrates a flowchart for explaining a basic operation of the captured image transfer system 1 according to the first embodiment.

In FIG. 3, when the user 10 touches the camera capturing mode button 107 to shift to the capturing display mode (step S101), the smartphone 100 displays the captured image captured by the in-camera 102 on the display screen 101 (step S102). The capturing display mode is the mode in which the captured image captured by the out-camera 103 is displayed on the display screen 101 of the smartphone 100.

At this time, it is detected whether the user 10 is looking at the display screen 101 of the smartphone 100 (step S103).

Upon determining that the user 10 is not looking at the display screen 101 (step S103: No), the processor 167 of the smartphone 100 stops displaying the captured image, displays the extended shutter button 134 (in the drawings, the "extended shutter button" is shown as "extended SB") on the display screen 101 (step S104), and transmits the captured image to the HMD 200 (step S105). An operation mode for transferring the captured image to the HMD 200 is referred to as a capturing transfer mode.

The HMD 200 receives the captured image as transferred, and the processor 267 displays the captured image as received on the display 132 of the HMD 200 (step S121).

When the extended shutter button 134 is touched in this state (step S106: Yes), the processor 167 of the smartphone 100 records the captured image in the memory 170 (step S107).

After the captured image is recorded (step S107), or if the extended shutter button 134 is not touched (step S106: No) and the capturing transfer mode of the smartphone 100 is not terminated (step S108: No), it is determined again whether the user 10 is looking at the display screen 101.

If it is determined that the user 10 is not looking at the display screen 101 (step S109: No), the captured image continues to be transferred to the HMD 200 (step S105).

On the other hand, if it is determined that the line of sight of the user 10 is on the display screen 101 while the captured image is being displayed on the HMD 200 (step S109: Yes), the processor 167 of the smartphone 100 stops transferring the captured image to the HMD 200 and transmits a display stop signal (step S110). Then, the processing returns to step S102.

In the HMD 200, reception of the transfer image is stopped, and in response to the display stop signal as received, the captured image as being displayed is deleted (step S122). In the smartphone 100, the processing returns to step S102 which corresponds to the capturing displaying mode.

If the user 10 is looking at the display screen 101 of the smartphone 100 (step S103: Yes), he or she can touch the shutter button 120 (in the drawings, shown as "SB") while viewing the captured image as being displayed on the display screen 101 of the smartphone 100 to record the captured image (step S111: Yes, step S112).

In absence of an instruction to terminate the capturing display mode of the smartphone 100 (step S113: No), the processing returns to step S102.

On the other hand, upon receiving the instruction to terminate the capturing display mode of the smartphone 100 (step S113: Yes) or an instruction to terminate the capturing transfer mode of the smartphone 100 (step S108: Yes), the capturing image transfer and display processing from the smartphone 100 to the HMD 200 is ended.

According to the first embodiment, the user 10 can reliably view the captured image on the HMD 200 worn on the head even in the situation where it is difficult for the user 10 to see the display screen 101 on which the captured image of the smartphone 100 is being displayed.

Furthermore, in the situation where the display screen 101 on which the captured image of the smartphone 100 is being displayed is difficult to be seen, a touch operation on the shutter button 120 displayed on the smartphone 100 may be difficult to be made. In this case, displaying the extended shutter button 134 on the display screen 101 allows the user 10 to perform the shutter button operation in an area of the display screen 101 which is larger than that for the shutter button 120. This can realize the easy and convenient shutter button operation for capturing images using a camera.

Still further, in the case where the display screen 101 of the smartphone 100 is sufficiently seen from the user 10, the captured image is not transferred to the HMD 200 and displayed on the display screen 101, so that the user 10 can operate the shutter button 120 on the display screen 101 while directly viewing the captured image as being displayed on the display screen 101 of the smartphone 100.

Second Embodiment

In the second embodiment, the tilt of the captured image is corrected so as to bring the captured image in an original state, and a corrected captured image 402 is transferred to the HMD 200. Here, the original state refers to the state in which the tilt of the subject captured in the captured image is corrected in a direction that cancels the tilt of the smartphone 100.

Figure 4:
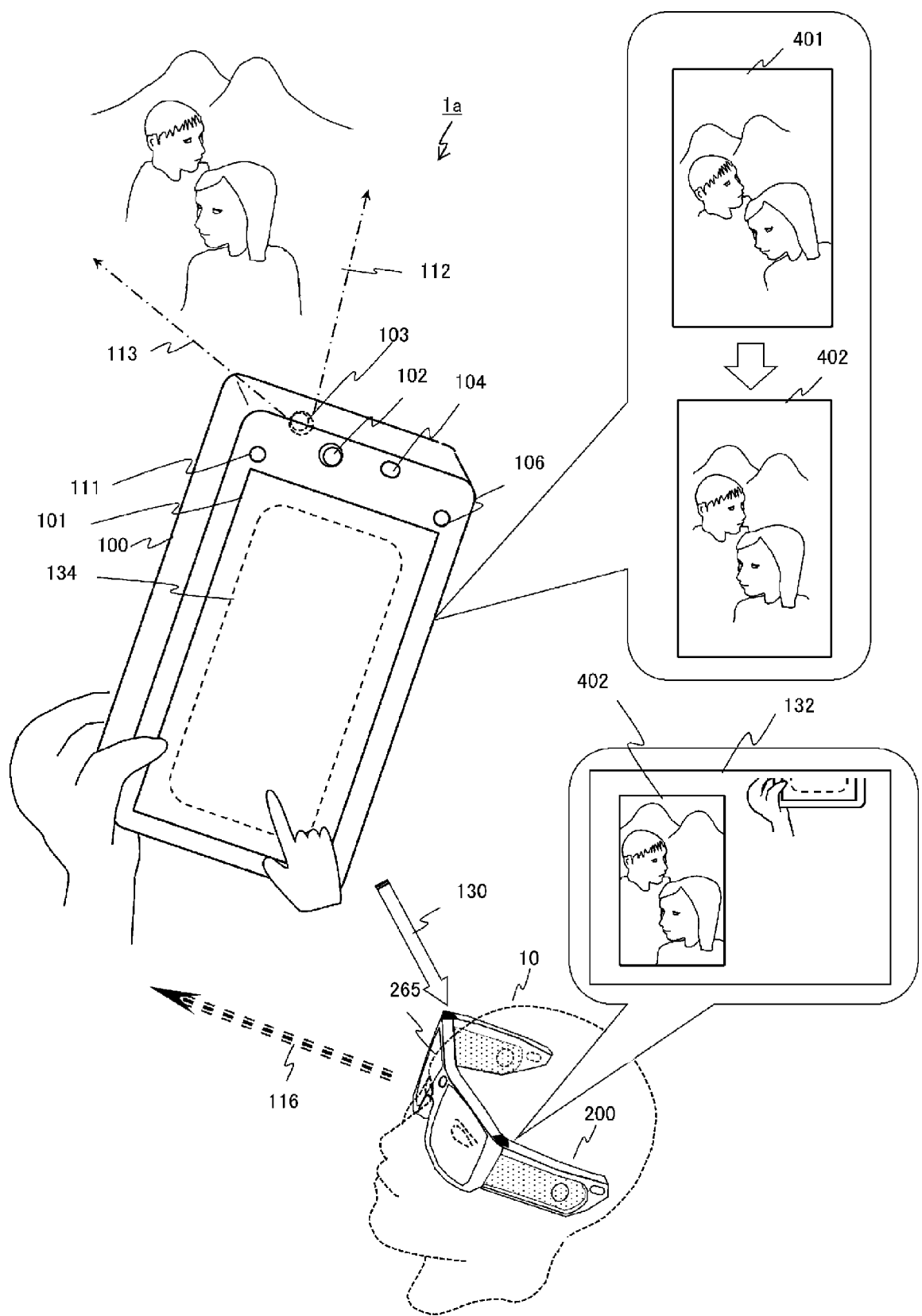
FIG. 4 is a diagram schematically explaining the appearance of a captured image transfer and display system according to the second embodiment.

FIG. 4 is a diagram schematically explaining the appearance of a captured image transfer and display system 1a according to the second embodiment.

When trying to capture images using a camera in the state where the display screen 101 of the smartphone 100 cannot be seen or is difficult to be seen, the user 10 is likely to tilt the smartphone 100. The subject captured using the camera in this state is shown, as the captured image, with being tilted in the opposite direction by the amount of the tilt of the smartphone 100.

As illustrated in FIG. 4, when the user 10 tilts the smartphone 100 to the right because he or she cannot see the display screen 101 of the smartphone 100, the image of the subject thus captured using the camera of the smartphone 100 which has been tilted to the right is obtained as a captured image 401 in which the subject is tilted to the left and displayed. Even if such the captured image 401 is transferred from the smartphone 100 to the HMD 200 and displayed on the HMD 200, the display screen displaying the captured image 401 with its subject being tilted is the one which is difficult for the user 10 to see. According to the present embodiment, the reduction in the visibility of a captured image caused by the tilt of the smartphone 100 can be prevented.

Figure 5:
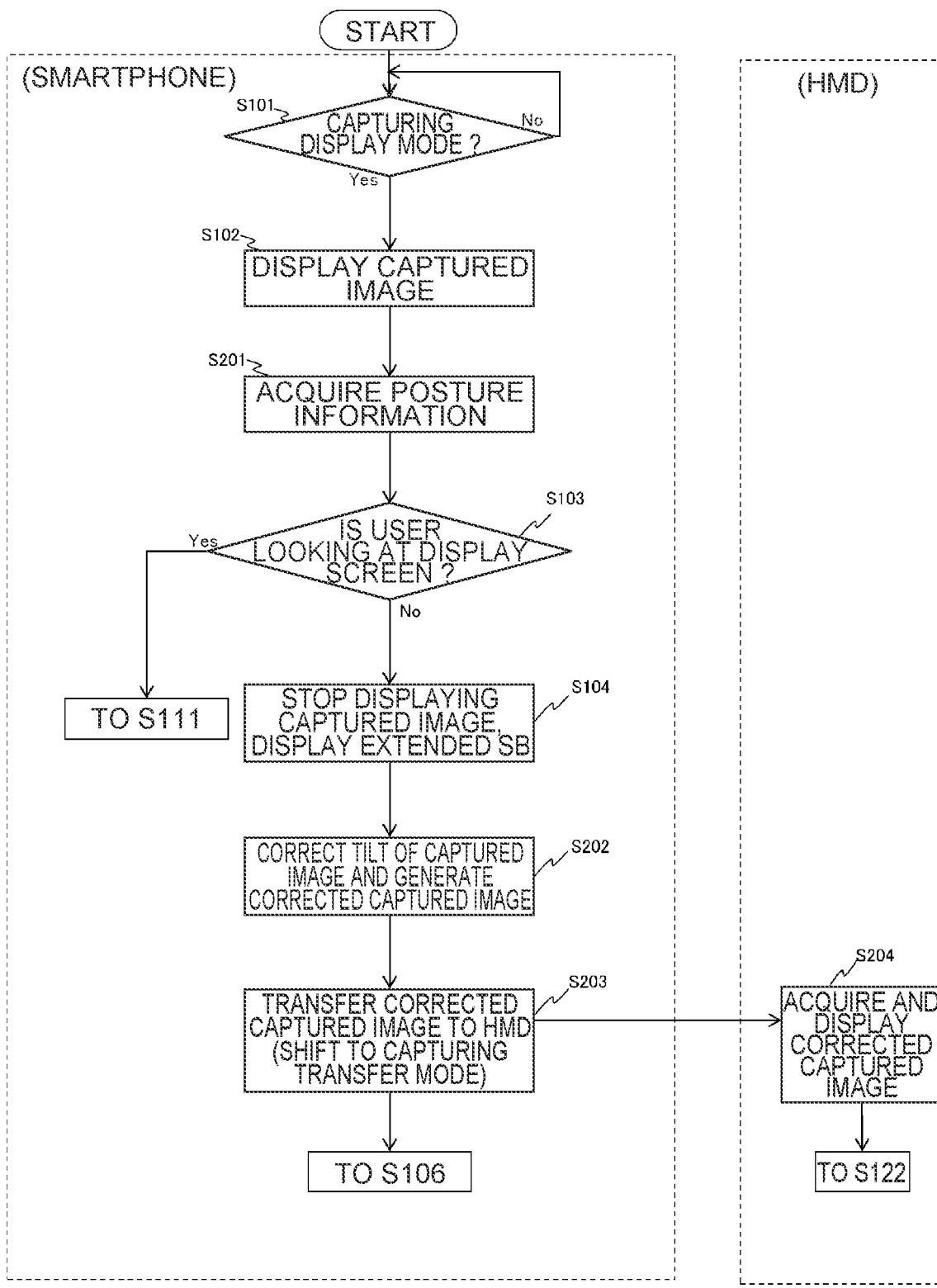
FIG. 5 illustrates a flowchart of the processing by a captured image transfer and display system according to the second embodiment.

FIG. 5 illustrates a flowchart of the processing flow of the captured image transfer and display system 1a according to the second embodiment. In FIG. 5, for the convenience of explanation, the features different from those of the first embodiment are mainly described, and explanation for the common steps is partially omitted.

Upon carrying out the control to start the capturing display mode (step S101), the processor 167 of the smartphone 100 displays the capturing image on the display screen 101 (step S102), and starts acquiring the posture information by the group of posture sensors (step S201). The group of posture sensors is a generic term of the acceleration sensor 161, the gyro sensor 162, and the geomagnetic sensor 163, and the posture information is a generic term of the acceleration information, the angular velocity information, and the geomagnetic information.

Upon determining that the line of sight of the user 10 is not on the display screen 101 (step S103: No), stopping displaying the captured image on the display screen 101, and displaying the extended shutter button 134 (step S104), the processor 167 corrects the tilt of the captured image (step S202).

The processor 167 detects the tilt of the smartphone 100 based on the posture information, corrects the image in accordance with the detected tilt quantity of the smartphone 100 by turning back the tilt of the subject captured in the captured image to the opposite direction, so as to bring the subject in an original state on the display screen 101 without being tilted, and generates the corrected captured image 402.

The processor 167 transfers the corrected captured image 402 to the HMD 200 (step S203), and the processor 267 of the HMD 200 displays the corrected captured image 402 as received on the display 265 (step S204). The other steps are the same as those of the first embodiment.

According to the present embodiment, the corrected captured image 402 in which the subject having no tilt is captured is displayed on the display screen 132 of the HMD 200, so that the user 10 can view the subject without any discomfort.

It may be configured that, when a touch operation on the shutter button 120 is detected in step S111 and step S106, which of the captured images, namely, the pre-corrected captured image with the subject being tilted or the corrected captured image 402, is to be stored can be selected.

In the description above, the tilt of the smartphone 100 is detected based on the posture information, however, the method of detecting the tilt of the smartphone 100 based on the captured image using a well-known image recognition processing algorithm without using the posture information may be employed.

Third Embodiment

The third embodiment is the embodiment for improving the visibility when the hand holding the smartphone 100 is covering the display screen 101 of the smartphone 100.

Figure 6:
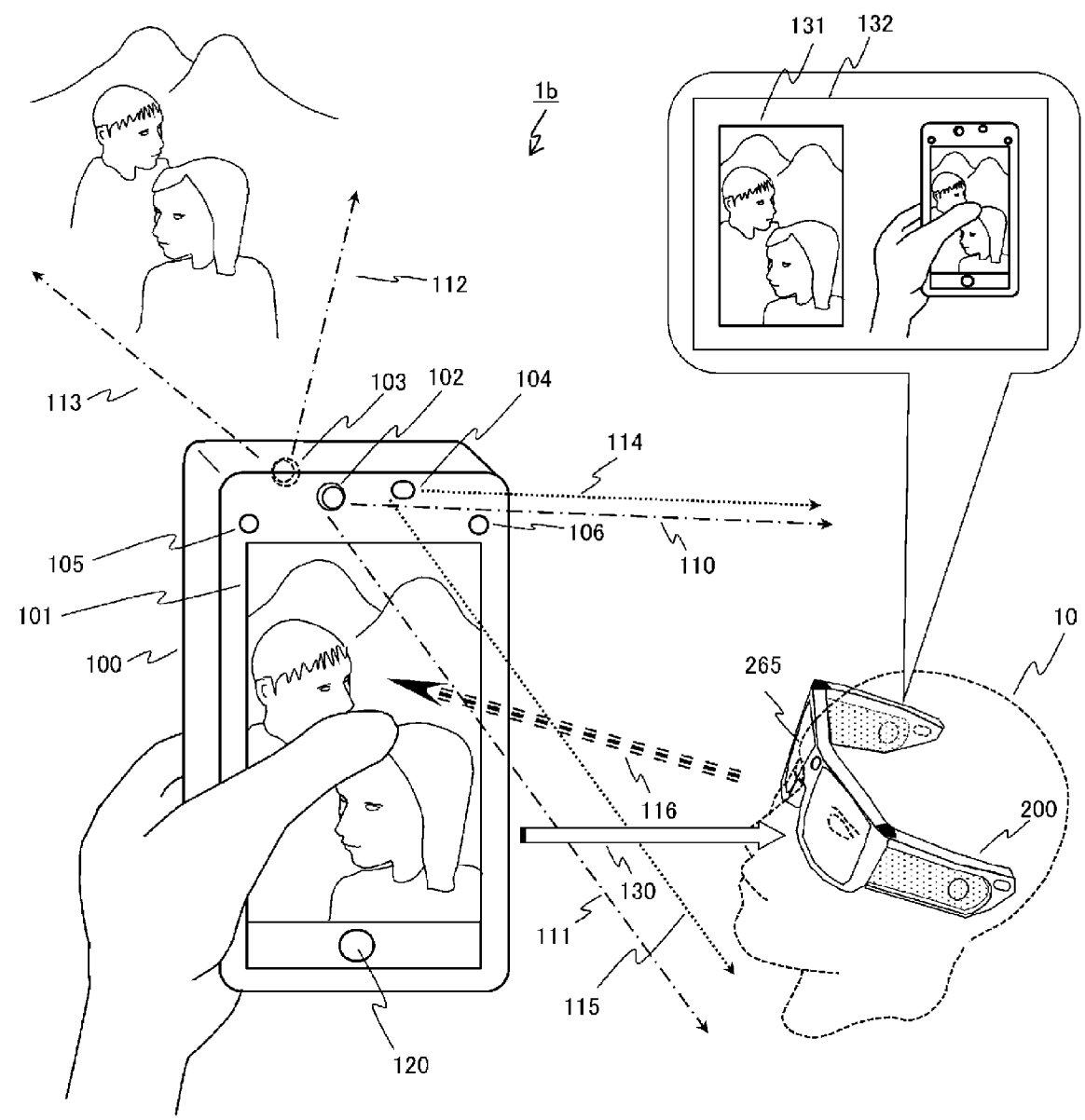
FIG. 6 is a diagram schematically explaining the appearance of a captured image transfer and display system according to the third embodiment.

FIG. 6 is a diagram schematically explaining the appearance of a captured image transfer and display system 1b according to the third embodiment.

As illustrated in FIG. 6, even in the state where the user 10 can see the display screen 101 of the smartphone 100, if his or her hand holding the smartphone 100 is covering the display screen 101 of the smartphone 100, the user 10 cannot view all of the captured image displayed on the display screen 101. According to the present embodiment, the reduction in the visibility of a captured image caused by an obstacle on the display screen 101 of the smartphone 100 can be improved.

Figure 7:
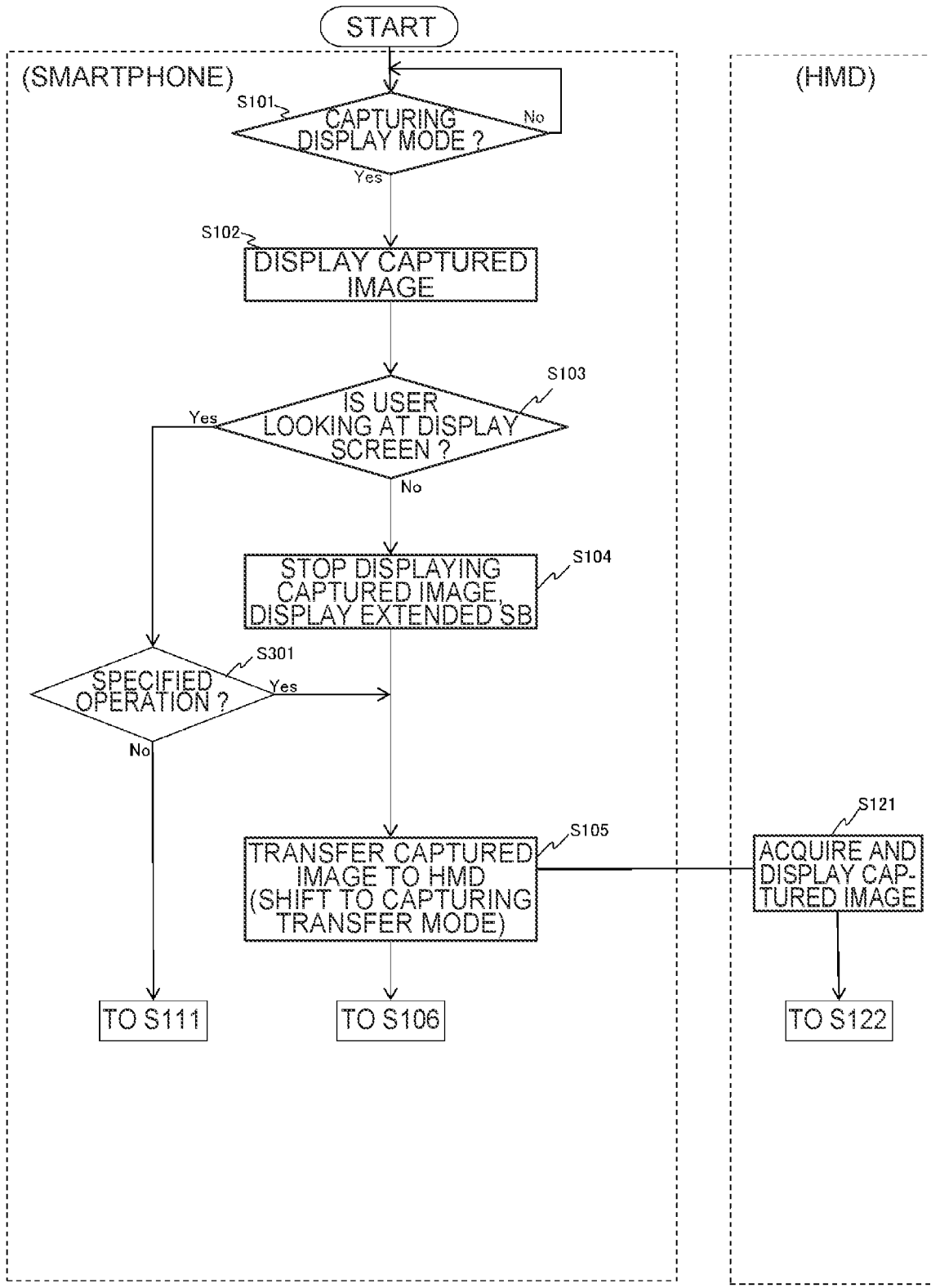
FIG. 7 illustrates a flowchart of the processing by a captured image transfer and display system according to the third embodiment.

FIG. 7 illustrates a flowchart of the processing flow of the captured image transfer and display system 1b according to the third embodiment. In FIG. 7, for the convenience of explanation, the features different from those of the first embodiment are mainly described, and explanation for the common steps is partially omitted.

The touch panel 164 configured on the display surface of the display 165 detects a touch operation on the touch panel 164 and outputs touch information indicating the position and area that are touched to the processor 167.

Here, upon determining that the point of view of the user 10 is on the display screen 101 (step S103: Yes), the processor 167 determines whether the touch panel 164 is carrying out a specified operation for determining whether the hand of the user 10 is covering the display screen 101 of the smartphone 100.

The specified operation is the operation limited for a touch operation, which is carried out to determine that the hand is covering the display screen 101 in order to prevent the captured image from being transferred to the HMD 200 even though the touch operation detected by the touch panel 164 is intended to, for example, touch the shutter button 120.

For example, a touch operation on a specified area of the display screen 101 may be defined as the specified operation. The specified area may be set at the position where the touched position hinders the visibility of the captured image, for example, a portion near the center of the screen, not at a peripheral portion of the display screen 101.

In other words, when the portion covered by the hand is included in the specified area, the captured image is displayed on the HMD 200, while, when the portion covered by the hand is outside the specified area, it is determined that the user 10 do not have much trouble in fully viewing the display screen 101, and the captured image may not be displayed on the HMD 200.

Furthermore, in order to prevent the captured image from being transferred to the HMD 200 due to an unintentional touch on the specified area, it may be determined that the specified operation has been carried out when the touch operation on the specified area continues for a predetermined period of time or longer.

The specified area may correspond to the area set for the extended shutter button 134.

Upon detecting the specified operation (step S301: Yes), the processor 167 transmits the captured image to the HMD 200 (step S105) and also transmits the display start signal for displaying the captured image as transferred.

If the specified operation is not detected (step S301: No), the processor 167 detects that a touch operation on the shutter button 120 has been performed (step S111).

According to the present embodiment, when it is detected that the hand holding the smartphone 100 is covering the display screen 101 of the smartphone 100, the captured image is transferred from the smartphone 100 to the HMD 200, so that the captured image 131 can be displayed on the display screen 132 of the HMD 200.

In a modification, the interval between the smartphone 100 and the HMD 200 is detected using the depth sensor 104 of the smartphone 100, or the interval between the smartphone 100 and the HMD 200 is detected using the depth sensor 204 of the HMD 200 and then the detected distance information is notified to the smartphone 100, so that, in the smartphone 100, using the condition where the detected interval is equal to or more than a distance threshold set based on the visibility of the user 10 as a trigger, transfer of the captured image from the smartphone 100 to the HMD 200 may be started.

Thus, in the state where, although the user 10 can view the display screen 101 of the smartphone 100 to some extent but cannot see it well because the screen 101 is too far away, displaying the captured image transferred from the smartphone 100 to the HMD 200 on the display screen 132 of the HMD 200 enables the user 10 to easily view the captured image. This can realize the improved the convenience.

Fourth Embodiment

The fourth embodiment is the embodiment for displaying both an image that was already captured by a camera and recorded by means of a shutter operation (referred to as a "recorded captured image") and an image that is being captured by the camera (captured image) together on the HMD 200. Here, displaying both the images includes, in addition to the case in which a recorded captured image 601 and the captured image are displayed in parallel on a single screen, the case in which the recorded captured image 601 and the captured image are switched therebetween and displayed. Hereinafter, the case of displaying them in parallel will be explained.

Figure 8A:
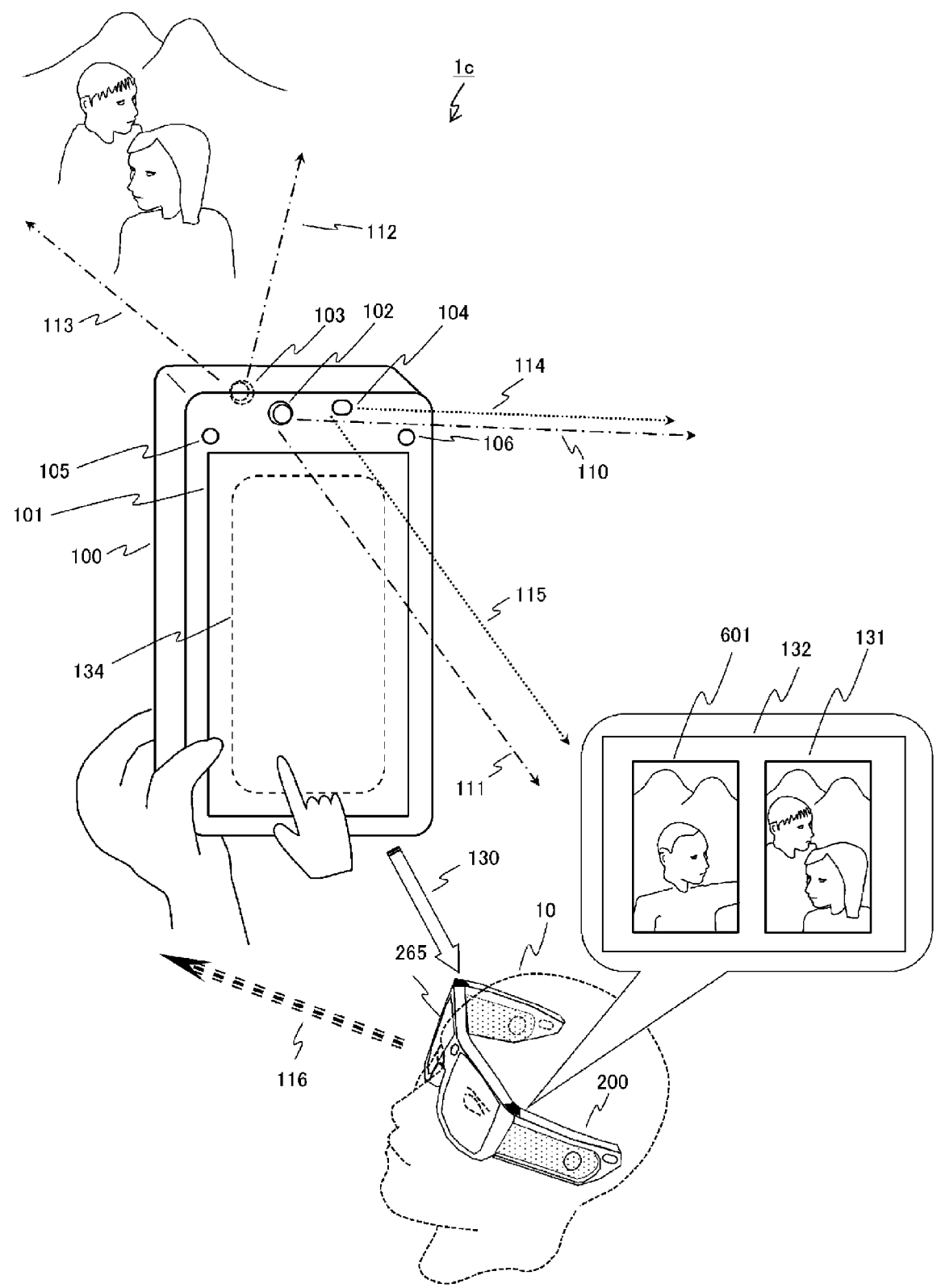
FIG. 8A is a diagram schematically explaining the appearance of a captured image transfer and display system according to the fourth embodiment.
Figure 8B:
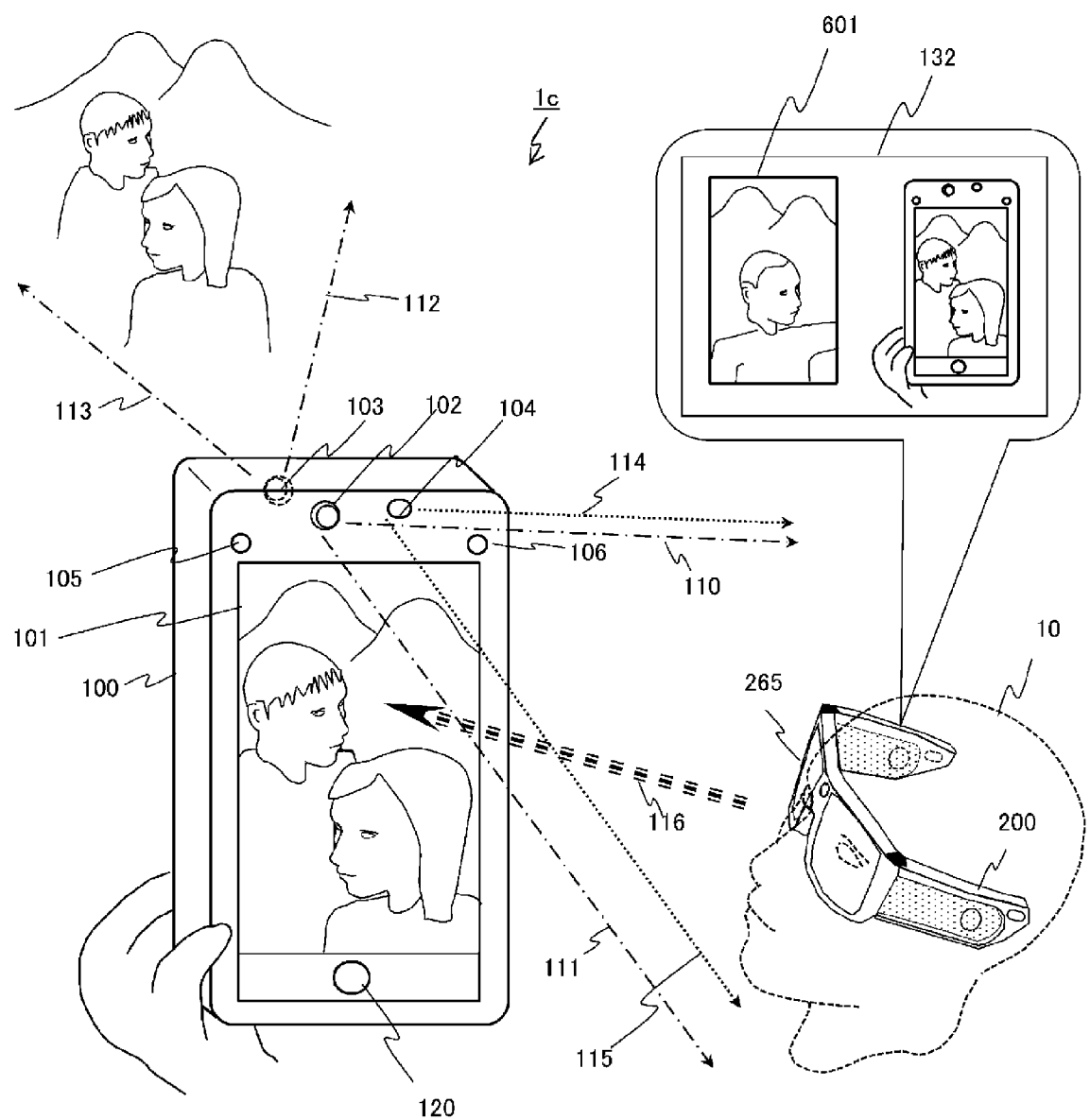
FIG. 8B is a diagram schematically explaining the appearance of a captured image transfer and display system according to the fourth embodiment.

Each of FIG. 8A and FIG. 8B is a diagram schematically explaining the appearance of a captured image transfer and display system 1c according to the fourth embodiment.

Before or when the recorded captured image 601 and the captured image 131 are displayed in parallel on the HMD 200, the recorded captured image 601 has been transferred to the HMD 200 from the smartphone 100 and stored in the HMD 200, and then is displayed on the display 265 with its display range 703 and resolution being changed by the processor 267 of the HMD 200.

FIG. 8A illustrates, when the user 10 is not looking at the display screen 101 of the smartphone 100, both the captured image 131 that is being captured by the camera and transferred from the smartphone 100 to the HMD 200 and the recorded captured image 601 are displayed on the display screen 133 of the HMD 200.

This enables the user 10 to simultaneously view both the captured image 131 being captured and the recorded captured image 601. In other words, the user 10 who wishes to check the recorded captured image 601 while viewing the captured image 131 currently being captured by the camera does not have to switch the displayed image to the recorded captured image 601, which greatly improves the usability.

FIG. 8B illustrates the case where the user 10 is looking at the display screen 101 of the smartphone 100, and in this case, since the captured image 131 being captured by the camera is not transferred from the smartphone 100 to the HMD 200, the user 10 directly views the captured image 131 being captured by the camera on the display screen 101 of the smartphone 100 while viewing the recorded captured image 601 displayed on the display screen 132 of the HMD 200.

In the case of displaying a plurality of recorded captured images 601, the recorded captured image 601 may be switched in response to an action of shaking the head.

Furthermore, the position of the display screen 101 of the smartphone 100 may be detected using the out-camera 203 of the HMD 200 to control the position for displaying the recorded captured image 601, so that it does not overlap with the display screen of the smartphone 100.

Figure 9:
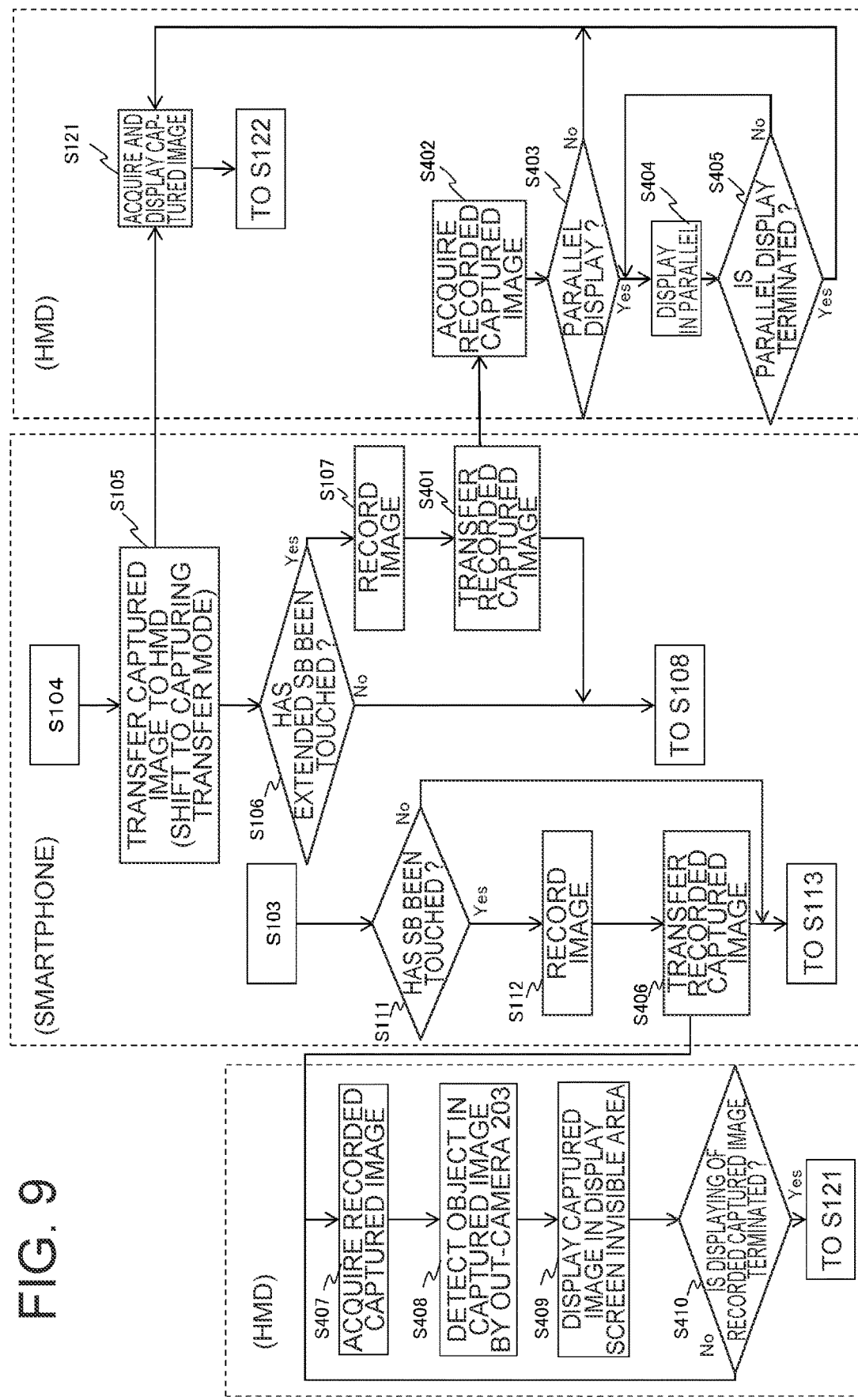
FIG. 9 illustrates a flowchart of the processing by a captured image transfer and display system according to the fourth embodiment.

FIG. 9 illustrates a flowchart of the processing flow of the captured image transfer and display system 1c according to the fourth embodiment. In FIG. 9, for the convenience of explanation, the features different from those of the first embodiment are mainly described, and explanation for the common steps is partially omitted.

Upon recording the captured image in response to a touch operation on the extended shutter button 134 (step S107), the processor 167 of the smartphone 100 transmits the captured image 601 as recorded to the HMD 200 (step S401).

The processor 267 of the HMD 200 acquires the recorded captured image 601 (step S402). In the case of parallel display (step S403: Yes), the captured image 131 and the recorded captured image 601 are displayed in parallel on the display screen 132 (step S404). The parallel display continues until an operation for terminating the parallel display is performed (step S405: No), and after the parallel display is terminated (step S405: Yes), the processing proceeds to step S121.

Similarly, in the case of having recorded an image in response to a touch operation on the shutter button 120 (step S112) when the point of view of the user 10 is on the display screen 101, the processor 167 of the smartphone 100 transmits the recorded captured image 601 (step S406).

Upon acquiring the recorded captured image (step S407), the processor 267 of the HMD 200 detects an object in the captured image by the out-camera 203 (step S408), and identifies the position where the real image on the display screen 101 of the smartphone 100 can be viewed through the display 265. Then, the processor 267 identifies, on the display 265, the area where the display screen 101 cannot be viewed (display screen invisible area), and displays the recorded captured image 601 on the display screen invisible area (step S409). Thereafter when displaying of the recorded captured image 601 is to be stopped (step S410: Yes), the processing proceeds to step S121, and when displaying of the recorded captured image 601 is to be continued (step S410: No), the processing returns to step S407.

According to the present embodiment, the user 10 can also view the recorded captured image 601 together with the captured image 131 currently being captured by the camera, in either the cases where the captured image 131 has been transferred to the HMD 200 (FIG. 8A) or it is viewed on the display screen 101 of the smartphone 100 (FIG. 8B).

Fifth Embodiment

The fifth embodiment is the embodiment for displaying a panoramic image 702 captured by the smartphone 100 on the HMD 200. This embodiment corresponds to the case where the recorded captured image 601 according to the fourth embodiment is the panoramic image 702 obtained by panorama image capturing.

Figure 10:
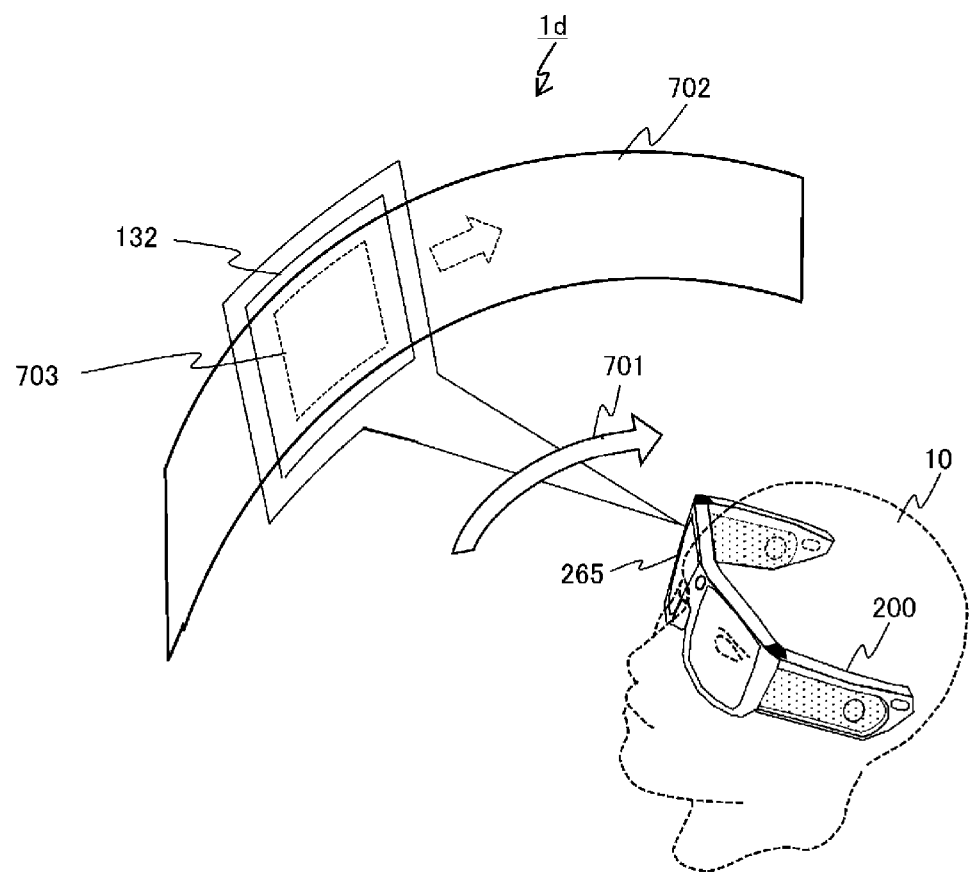
FIG. 10 is a diagram schematically explaining the appearance of a captured image transfer and display system according to the fifth embodiment.

FIG. 10 is a diagram schematically explaining the appearance of a captured image transfer and display system 1d according to the fifth embodiment.

As illustrated in FIG. 10, when the user 10 wearing the HMD 200 shakes his or her head, the direction at which the user 10 shook the head and a panorama angle 701 are detected using the acceleration sensor 261, the gyro sensor 262, and the geomagnetic sensor 263 which are mounted on the HMD 200. Then, in accordance with the direction in which the user 10 shook his or her head and the panorama angle 701 as detected, a display range 703 for displaying the panoramic image 702 is made moved.

Figure 11:
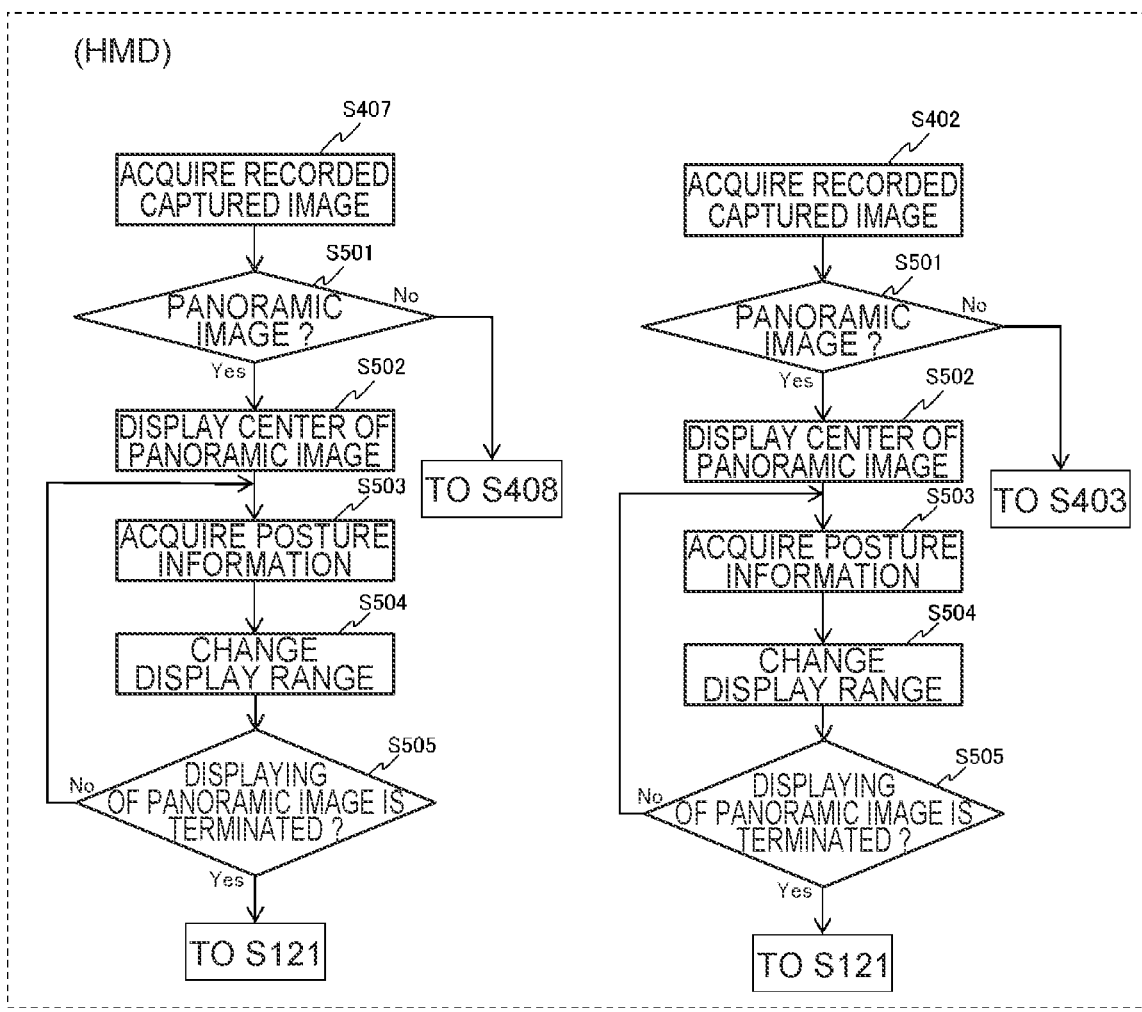
FIG. 11 illustrates a flowchart of the processing by a captured image transfer and display system according to the fifth embodiment.

FIG. 11 illustrates a flowchart of a processing flow of the captured image transfer and display system 1d according to the fifth embodiment. In FIG. 11, for the convenience of explanation, the features different from those of the fourth embodiment are mainly described, and explanation for the common steps is partially omitted.

Upon receiving the recorded captured image 601 (step S402, step S407) the processor 267 of the HMD 200 checks whether the recorded captured image 601 is the panoramic image 702. If it is a normal image that is not the panoramic image 702 (step S501: No), the processor 267 proceeds the processing to steps S403, S408, and executes the processing in the same manner as the fourth embodiment.

If determining that the recorded captured image 601 is the panoramic image 702 (step S501: Yes), the processor 267 displays the panoramic image 702 such that the center of the panoramic image 702 is positioned near the center of the display 265 (step S502).

The processor 267 acquires the posture information by the posture sensor of the HMD 200 (step S503), and changes the display range 703 of the panoramic image 702 depending on the posture information (step S504). The processing returns to step S503 if displaying of the panoramic image continues (step S505: No), while proceeding to step S121 if it is to be stopped (step S505: Yes).

According to the present embodiment, the display range 703 of the panoramic image 702 that has already been captured can be easily changed. This enables the user 10 to easily select the display range 703 of the panoramic image 702 to be viewed.

Sixth Embodiment

The sixth embodiment is the embodiment suitable for capturing an image of the user 10 by himself or herself using the smartphone 100, such as a selfie.

Figure 12:
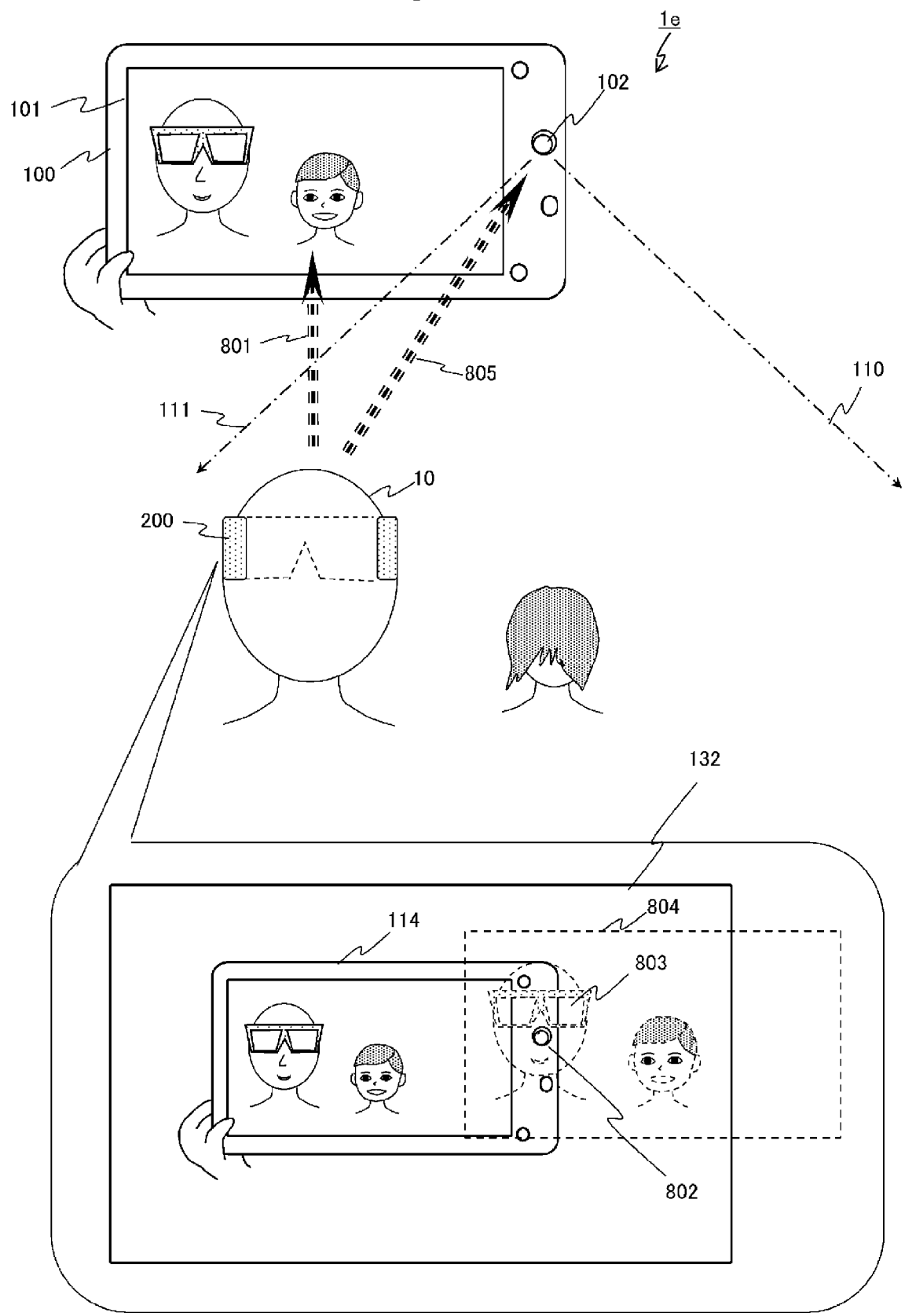
FIG. 12 is a diagram schematically explaining the appearance of a captured image transfer and display system according to the sixth embodiment.

FIG. 12 is a diagram schematically explaining the appearance of a captured image transfer and display system 1e according to the sixth embodiment.

When the user 10 takes a selfie to capture an image of himself or herself while viewing the display screen 101 of the smartphone 100, as illustrated in FIG. 12, a line-of-sight destination 801 of the user 10 is directed to the display screen 101 of the smartphone 100, however, there may be cases where the position of the line-of-sight destination 801 of the user 10 would be out of the position of the in-camera 102 for capturing an image of the user 10.

In this case, the line of sight of the user 10 is not being directed to the in-camera 102, and thus the image to be captured by the in-camera 102 would be the captured image in which the user 10 is not looking at the camera.

For responding to the above, in the present embodiment, the HMD 200 detects the position of the in-camera 102 of the smartphone 100, recognizes the user 10 and the position of his or her eyes based on the captured image, and changes the displaying of the captured image transferred from the smartphone 100 so that the two positions are aligned with each other.

In other words, even while the user 10 can view the display screen 101 of the smartphone 100, the captured image captured by the in-camera 102 is transferred to the HMD 200, and furthermore, a captured image 804 as transferred is displayed on the display screen 132 of the HMD 200 so as to align a position 803 of the user 10 on the captured image as transferred with a camera position 802 on the image being viewed by the user 10.

In this state, when the user 10 turns his or her line of sight toward himself or herself on the captured image as transferred and takes a selfie, in the captured image thus captured as the selfie, a line-of-sight destination 805 is being directed to the camera, so that the captured image in which the user 10 is looking at the camera can be obtained.

Figure 13:
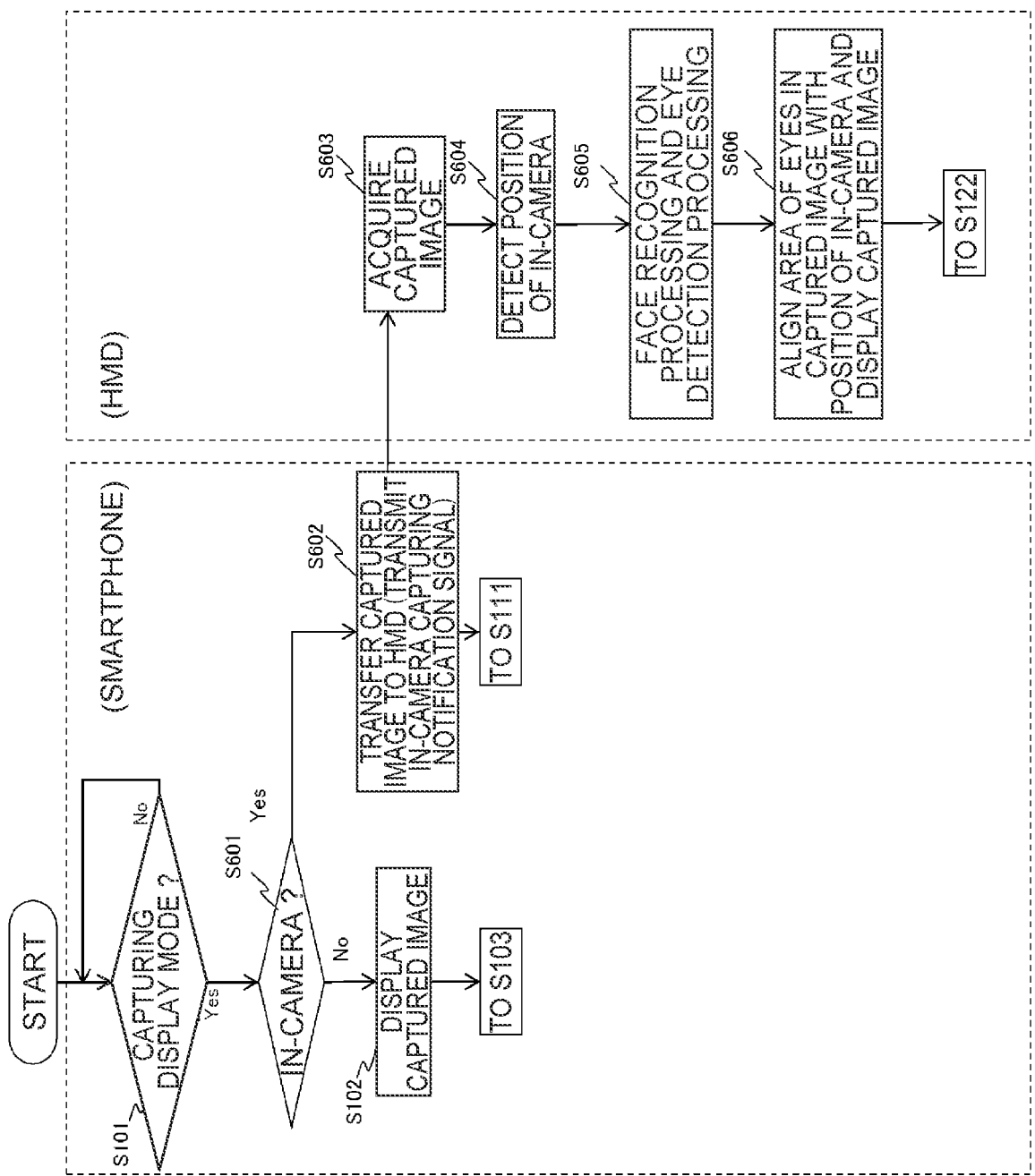
FIG. 13 illustrates a flowchart of the processing by a captured image transfer and display system according to the sixth embodiment.

FIG. 13 illustrates a flowchart of the processing flow of the captured image transfer and display system 1e according to the sixth embodiment. In FIG. 13, for the convenience of explanation, the features different from those of the first embodiment are mainly described, and explanation for the common steps is partially omitted.

Upon detecting that the camera is in the capturing displaying mode (step S101: Yes), the processor 167 of the smartphone 100 checks whether the in-camera 102 is active (step S601). Upon confirming that the in-camera 102 is active (step S601: Yes), regardless of whether the line-of-sight destination of the user 10 is on the display screen 101, the processor 167 transmits, to the HMD 200, the captured image as well as an in-camera capturing notification signal indicating that the in-camera 102 is capturing an image (step S602).

When the out-camera 203 is active (step S601: No), the captured image is displayed on the display screen 101 (step S102).

In the HMD 200, upon receiving the captured image (step S603), the processor 267 carries out the object detection processing based on the captured image captured by the out-camera 203 of the HMD 200, and detects the position of the in-camera 102 of the smartphone 100 (step S604).

Furthermore, the processor 267 executes the face recognition processing and eye detection processing on the captured image as received, and detects an area of the eyes of the user 10 captured in the captured image (step S605).

The processor 267 superimposes and displays the captured image on the display 265 so that the area of the eyes detected based on the captured image overlap the position of the display 265 which is located on the line of sight of the user 10 who is viewing the in-camera 102 through the display 265 (step S606). Then, the processing proceeds to step S122.

According to the present embodiment, capturing of an image of the face of the user 10 using the in-camera 102 is assisted so that the image in which the line of sight is directed to the in-camera 102 can be obtained.

In the present embodiment, the HMD 200 appears in the selfie. In a modification of the present embodiment, the processor 167 of the smartphone 100 may carry out the image processing on the selfie such as the skin color detection and correction processing or the eye detection processing, so as to erase the frame or the display 265 of the HMD 200.

The present invention is not limited to the embodiments described above, and includes various modifications. For example, the embodiments described above have been explained in detail for the purpose of clarifying the present invention, and the present invention is not limited to those having all the features as described. In addition, a part of the configuration of the present embodiments can be replaced with that of other embodiments, and the features of other embodiments and modifications can be added to the configuration of the present embodiments. Furthermore, it is possible to add, delete, or replace other configurations with respect to a part of the configuration of the present embodiments.

For example, in each of the embodiments, the cases in which various capturing operations are carried out by the smartphone 100 have been described, however, other approaches may be employed. In other words, it may be configured that the various capturing operations are carried out in the HMD 200 while the HMD 200 detects the instruction operations of the various capturing operations carried out in the HMD 200 and transfers the instruction operations of various capturing operations as detected to the smartphone 100, so that the operation instructions to the smartphone 100 is carried out in the HMD 200. The operation UI (User Interface) for this purpose may be displayed on the HMD 200.

Furthermore, in the embodiments described above, the smartphone 100 has been exemplified as the information processing device and the HMD 200 has been exemplified as the image display device. However, the information processing device is not limited to the smartphone 100, and includes any device having a camera capturing function and a display function of displaying a camera capturing screen, and the image display device is not limited to the HMD 200 and includes any device having an image display function. Furthermore, the present invention is applied not only to capturing of an image of a surrounding field of view but also to capturing of a selfie.

Some or all the configurations, functions, processing units, and processing means described above may be implemented by hardware, for example, by designing them with an integrated circuit. In addition, the configurations and functions described above may be implemented by software by interpreting and executing programs in which the processor implements the respective functions. Information such as programs, tables, and files for implementing various functions can be placed in recording devices such as a memory, hard disk, and solid-state drive (SSD), or recording media such as an IC card, SD card, and DVD. Furthermore, the control lines and information lines which are considered to be necessary for the purpose of explanation are indicated herein, but not all the control lines and information lines of actual products are necessarily indicated. It may be considered that almost all the configurations are actually connected to each other.

REFERENCE SIGNS LIST 1, 1a, 1b, 1c, 1d, 1e: captured image transfer and display system
10: user
100: smartphone
101: display screen
102: in-camera
103, 203: out-camera
104, 204: depth sensor
105, 205: left line-of-sight sensor
106, 206: right line-of-sight sensor
107: camera capturing mode button
110, 111, 112, 113, 114, 115: direction
116, 143, 801, 805: line-of-sight destination
120, 151: shutter button
130: arrow
131, 401, 804: captured image
132, 133, 191: display screen
134: extended shutter button
141, 142: line of sight
161, 261: acceleration sensor
162, 262: gyro sensor
163, 263: geomagnetic sensor
164: tough panel
165, 265: display
166: telephone network communication unit
167, 267: processor
168, 268: program
169, 269: information data
170, 270: memory
171, 271: vibrator
172, 272: microphone
173, 273: speaker
174, 274: device-to-device communication unit
180, 280: bus
200: HMD
202, 402: corrected captured image
264: operation input interface
601: recorded captured image
701: panorama angle
702: panoramic image
703: display range
802: camera position

The invention claimed is:

1. An information processing device, comprising:
a camera;
a display screen for displaying a captured image captured by the camera;
a line-of-sight sensor configured to detect a line of sight of a user and output line-of-sight information indicating a line-of-sight direction of the user;
a communication unit configured to provide communication with an image display device that is separate from the information processing device; and
a processor connected to the camera, the display screen, the line-of-sight sensor, and the communication unit, respectively,
the processor being configured to:
determine whether a line-of-sight destination of the user is in the display screen based on the line-of-sight information while the camera is capturing an image;
upon determining that the line-of-sight destination of the user is not in the display screen, transfer the captured image being displayed on the display screen to the image display device via the communication unit; and
transmit, to the image display device, a display start signal for causing the image display device to display the captured image as transferred.

2. The information processing device according to claim 1, further comprising a storage in which the captured image is recorded, wherein
the display screen includes a shutter button for inputting an instruction of image recording to the storage, and an image display area in which the captured image is to be displayed,
the processor is connected to the storage, and
while transferring the captured image to the image display device, the processor carries out control to stop displaying the captured image and the shutter button on the display screen, and also display an extended shutter button for inputting the instruction of image recording to the storage in an area larger than an area of the shutter button within the image display area.

3. The information processing device according to claim 2, wherein
the processor carries out control to display the extended shutter button in an area inside a margin area predefined from an edge of the image display area.

4. The information processing device according to claim 1, wherein
upon determining that the line-of-sight destination of the user is in the display screen while transferring the captured image to the image display device, the processor stops transferring the captured image to the image display device, and transmits, to the image display device, a display stop signal for causing the image display device to stop displaying the captured image that has been transferred.

5. The information processing device according to claim 1, further comprising a posture sensor configured to detect a tilt of the information processing device and output posture information, wherein
the processor is connected to the posture sensor, and
the processor is configured to:
based on the posture information, correct a tilt of a subject captured in the captured image in a direction that cancels the tilt of the information processing device to generate a corrected captured image; and
transmit the corrected captured image and the display start signal to the image display device.

6. The information processing device according to claim 1, further comprising a touch panel laminated on the display screen, wherein
the touch panel is configured to detect a touch operation on the touch panel and output touch information,
the processor is connected to the touch panel, and
upon acquiring the touch information while the camera is capturing an image and the captured image is being displayed on the display screen, the processor transmits the captured image and the display start signal to the image display device.

7. The information processing device according to claim 1, further comprising a depth sensor configured to detect a distance from the information processing device to an object and output distance information, wherein
the processor is further connected to the depth sensor, and
the processor is configured to:
while the camera is capturing an image and the captured image is being displayed on the display screen, detect an interval between the information processing device and the image display device based on the distance information; and upon determining that the interval as detected is equal to or more than a predetermined distance threshold, transmit the captured image and the display start signal to the image display device.

8. A captured image transfer and display system comprising:

an information processing device equipped with a camera; and an image display device for displaying a captured image captured by the camera and received from the information processing device, the information processing device and the image display device being connected to communicate with each other, the information processing device including:
a display screen for displaying the captured image captured by the camera;
a line-of-sight sensor configured to output line-of-sight information indicating a line-of-sight direction of a user;
a first communication unit configured to communicate with the image display device; and
a first processor connected to each of the camera, the display screen, the line-of-sight sensor, and the first communication unit, the image display device including:
a second communication unit configured to communication with the information processing device;
a display for displaying the captured image transferred from the information processing device; and
a second processor connected to the display and the second communication unit, respectively, the first processor being configured to:
determine whether a line-of-sight destination of the user is in the display screen based on the line-of-sight information while the information processing device is capturing an image; and
upon determining that the line-of-sight destination of the user is not in the display screen, transfer the captured image being displayed on the display screen to the image display device via the first communication unit, and transmit a display start signal for causing the image display device to display the captured image as transferred, and the second processor being configured to, upon receiving the captured image and the display start signal via the second communication unit, display the captured image on the display in response to the display start signal.

9. The captured image transfer and display system according to claim 8, wherein the information processing device further includes a storage configured to record the captured image as a recorded captured image,
the first processor is further connected to the storage,
the first processor transfers the recorded captured image to the image display device, and
the second processor displays both the recorded captured image and the captured image.

10. The captured image transfer and display system according to claim 9, wherein
the recorded captured image is a panoramic image captured by the information processing device, the image display device is a head-mounted display of which the display is positioned in front of an eye of the user with being worn on a head of the user,
the head-mounted display includes a motion detection sensor configured to detect a motion of the head and output motion quantity information indicating a direction and a quantity of the motion,
the second processor is further connected to the motion detection sensor, and
the second processor is configured to:
upon receiving the panoramic image, display the panoramic image so that a center of the panoramic image is aligned with a center of the display; and
move a display range of the panoramic image in accordance with the motion quantity information to display the panoramic image on the display.

11. The captured image transfer and display system according to claim 8, wherein
the information processing device further includes an in-camera provided on a surface which is the same that for the display screen,
the first processor is further connected to the in-camera,
the image display device is a head-mounted display of which the display is positioned in front of an eye of the user with being worn on a head of the user,
the head-mounted display further includes an out-camera for capturing an image of an outside world,
the second processor is connected to the out-camera,
when the in-camera is activated and starts generating a captured image, the first processor transfers the captured image to the head-mounted display regardless of whether the line-of-sight destination of the user is in the display screen, and
the second processor is configured to:
carry out object detection processing on the captured image captured by the out-camera to detect a position of the in-camera;
execute face recognition processing and eye detection processing on the captured image as transferred from the information processing device to detect an area of the eye of the user captured in the captured image; and
superimpose and display the captured image as transferred from the information processing device on the display so that the area of the eye in the captured image overlaps a position where the user views the in-camera through the display.

12. A captured image transfer and display method to be executed while connecting an information processing device equipped with a camera and an image display device for displaying a captured image captured by the camera and received from the information processing device to communicate with each other, the method comprising:
by the information processing device, determining whether a line-of-sight destination of a user of the information processing device is in a display screen provided in the information processing device while the camera is capturing an image;
by the information processing device, upon determining that the line-of-sight destination of the user is not in the display screen, transferring the captured image being displayed on the display screen to the image display device and also transmitting, to the image display device, a display start signal for causing the image display device to display the captured image as transferred;

by the image display device, receiving the captured image and the display start signal; and by the image display device, displaying the captured image on a display provided in the image display device in response to the display start signal.

* * * * *